United States Patent
Kanayama

(10) Patent No.: US 11,843,851 B2
(45) Date of Patent: Dec. 12, 2023

(54) OPTICAL APPARATUS AND GENERATING METHOD

(71) Applicant: CANON KABUSHIKI KAISHA, Tokyo (JP)

(72) Inventor: Masaomi Kanayama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 17/546,125

(22) Filed: Dec. 9, 2021

(65) Prior Publication Data

US 2022/0191386 A1 Jun. 16, 2022

(30) Foreign Application Priority Data

Dec. 16, 2020 (JP) ................................ 2020-208760

(51) Int. Cl.
*H04N 23/62* (2023.01)
*G02B 7/28* (2021.01)
*G06N 20/00* (2019.01)
*H04N 23/65* (2023.01)

(52) U.S. Cl.
CPC ............... *H04N 23/62* (2023.01); *G02B 7/28* (2013.01); *G06N 20/00* (2019.01); *H04N 23/65* (2023.01)

(58) Field of Classification Search
CPC ...... H04N 23/62; H04N 23/65; H04N 23/667; H04N 23/64; G02B 7/28; G02B 7/36; G02B 7/282; G06N 20/00; G06N 3/006; G06N 3/084; G06N 7/01
See application file for complete search history.

(56) References Cited

U.S. PATENT DOCUMENTS

| | | | |
|---|---|---|---|
| 2009/0059062 A1* | 3/2009 | Toguchi | G03B 3/10 348/E5.042 |
| 2010/0289940 A1* | 11/2010 | Toguchi | H04N 23/673 348/E5.045 |
| 2014/0160245 A1* | 6/2014 | Cheng | H04N 13/296 348/47 |
| 2018/0172983 A1* | 6/2018 | Maeda | G06N 3/084 |
| 2018/0184064 A1* | 6/2018 | Cheng | H04N 23/611 |
| 2018/0249090 A1* | 8/2018 | Nakagawa | G06T 7/194 |
| 2019/0061049 A1* | 2/2019 | Kubo | B23K 26/032 |
| 2019/0387186 A1* | 12/2019 | Ando | H04N 25/40 |
| 2020/0130107 A1* | 4/2020 | Mochizuki | B23K 26/0626 |
| 2020/0279279 A1* | 9/2020 | Chaudhuri | G06N 5/04 |
| 2020/0326499 A1* | 10/2020 | Wang | G02B 7/08 |
| 2020/0333718 A1* | 10/2020 | Takiguchi | G03F 9/7092 |
| 2020/0387131 A1* | 12/2020 | Takigawa | G06N 20/00 |
| 2022/0174207 A1* | 6/2022 | Shigeta | H04N 23/617 |

FOREIGN PATENT DOCUMENTS

JP 2007006305 A 1/2007

* cited by examiner

*Primary Examiner* — Lin Ye
*Assistant Examiner* — John H Morehead, III
(74) *Attorney, Agent, or Firm* — ROSSI, KIMMS & McDOWELL LLP

(57) ABSTRACT

An optical apparatus includes a setting unit configured for a user to set a requirement relating to driving of an optical element by an actuator, and a processor configured to generate reward information for generating a machine learning model for controlling the driving, based on a level of the requirement. The setting unit is configured for the user to input a change of the level of the requirement.

15 Claims, 19 Drawing Sheets

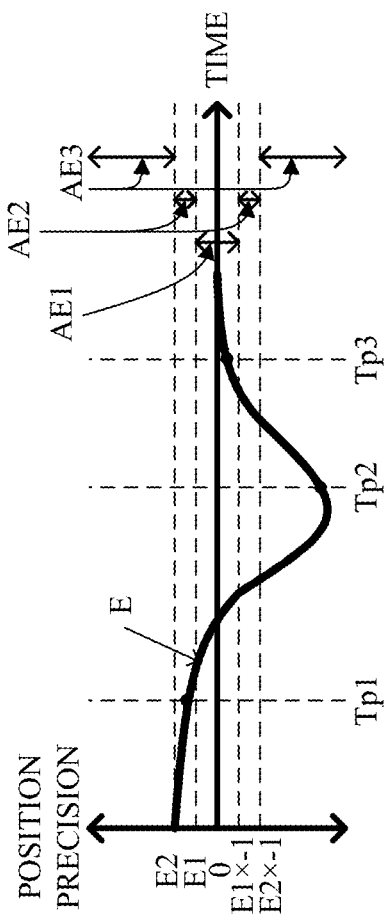
FIG. 8A1
FIG. 8A2
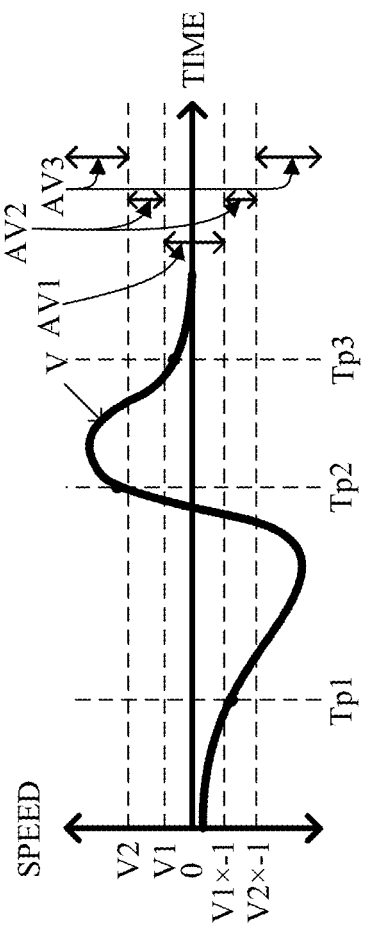
FIG. 8B1
FIG. 8B2

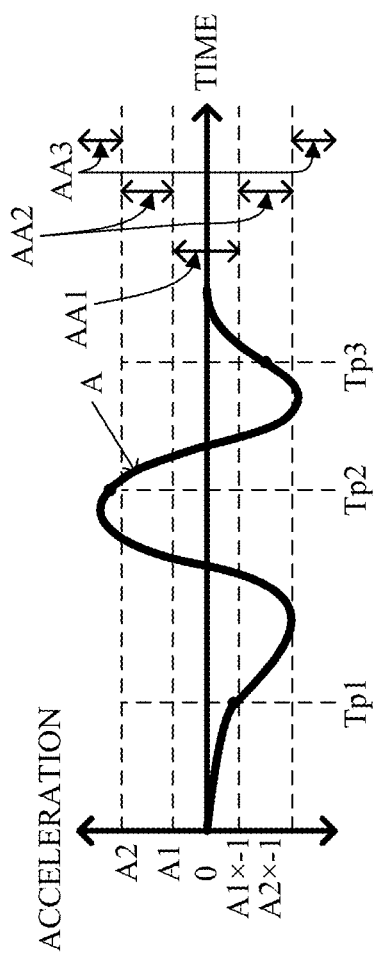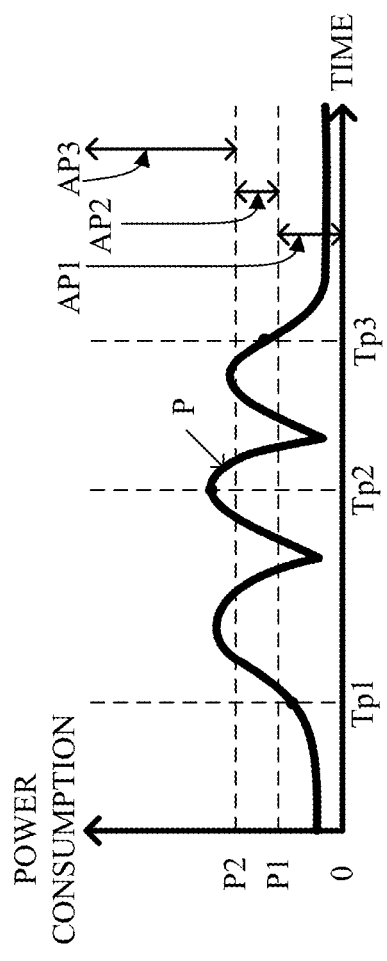
FIG. 8C1
FIG. 8C2
FIG. 8D1
FIG. 8D2

| | | REWARD INFORMATION | | | | | | | |
|---|---|---|---|---|---|---|---|---|---|
| | | APPARATUS CONSTRAINT REWARD INFORMATION | | | USER REQUIREMENT REWARD INFORMATION | | | | |
| POSITION PRECISION | | POSITION PRECISION REWARD INFORMATION REb | | | POSITION PRECISION REWARD INFORMATION REu | | | | |
| | | BOUNDARY VALUE | SCORE | | BOUNDARY VALUE | SCORE | | | |
| | | Eb1 | Eb2 | SEb1 | SEb2 | SEb3 | Eu1 | SEu1 | SEu2 | SEu3 |
| SPEED | | SPEED REWARD INFORMATION RVb | | | SPEED REWARD INFORMATION RVu | | | | |
| | | BOUNDARY VALUE | SCORE | | BOUNDARY VALUE | SCORE | | | |
| | | Vb1 | Vb2 | SVb1 | SVb2 | SVb3 | Vu1 | SVu1 | SVu2 | SVu3 |
| ACCELE-RATION | | ACCELERATION REWARD INFORMATION RAb | | | ACCELERATION REWARD INFORMATION RAu | | | | |
| | | BOUNDARY VALUE | SCORE | | BOUNDARY VALUE | SCORE | | | |
| | | Ab1 | Ab2 | SAb1 | SAb2 | SAb3 | Au1 | Au2 | SAu1 | SAu2 | SAu3 |
| POWER CONSUMP-TION | | POWER CONSUMPTION REWARD INFORMATION RPb | | | POWER CONSUMPTION REWARD INFORMATION RPu | | | | |
| | | BOUNDARY VALUE | SCORE | | BOUNDARY VALUE | SCORE | | | |
| | | Pb1 | Pb2 | SPb1 | SPb2 | SPb3 | Pu1 | Pu2 | SPu1 | SPu2 | SPu3 |

POSITION PRECISION USER REQUIREMENT REWARD CONVERSION INFORMATION UREu

| | BOUNDARY VALUE | | | SCORE | | |
|---|---|---|---|---|---|---|
| | Eu1 | Eu2 | | SEu1 | SEu2 | SEu3 |
| LEVEL1 | | Eu2L1 | | SEu1L1 | SEu2L1 | SEu3L1 |
| LEVEL2 | Eu1L2 | Eu2L2 | | SEu1L2 | SEu2L2 | SEu3L2 |
| LEVEL3 | Eu1L3 | Eu2L3 | | SEu1L3 | SEu2L3 | SEu3L3 |
| LEVEL4 | Eu1L4 | Eu2L4 | | SEu1L4 | SEu2L4 | SEu3L4 |
| LEVEL5 | Eu1L5 | Eu2L5 | | SEu1L5 | SEu2L5 | SEu3L5 |

FIG. 10B

QUIETNESS USER REQUIREMENT REWARD CONVERSION INFORMATION URSu

SPEED USER REQUIREMENT REWARD CONVERSION INFORMATION URVu

| | BOUNDARY VALUE | | SCORE | | |
|---|---|---|---|---|---|
| | Vu1 | Vu2 | SVu1 | SVu2 | SVu3 |
| LEVEL1 | Vu1L1 | Vu2L1 | SVu1L1 | SVu2L1 | SVu3L1 |
| LEVEL2 | Vu1L2 | Vu2L2 | SVu1L2 | SVu2L2 | SVu3L2 |
| LEVEL3 | Vu1L3 | Vu2L3 | SVu1L3 | SVu2L3 | SVu3L3 |
| LEVEL4 | Vu1L4 | Vu2L4 | SVu1L4 | SVu2L4 | SVu3L4 |
| LEVEL5 | Vu1L5 | Vu2L5 | SVu1L5 | SVu2L5 | SVu3L5 |

ACCELERATION USER REQUIREMENT REWARD CONVERSION INFORMATION URAu

| | BOUNDARY VALUE | | SCORE | | |
|---|---|---|---|---|---|
| | Au1 | Au2 | SAu1 | SAu2 | SAu3 |
| LEVEL1 | Au1L1 | Au2L1 | SAu1L1 | SAu2L1 | SAu3L1 |
| LEVEL2 | Au1L2 | Au2L2 | SAu1L2 | SAu2L2 | SAu3L2 |
| LEVEL3 | Au1L3 | Au2L3 | SAu1L3 | SAu2L3 | SAu3L3 |
| LEVEL4 | Au1L4 | Au2L4 | SAu1L4 | SAu2L4 | SAu3L4 |
| LEVEL5 | Au1L5 | Au2L5 | SAu1L5 | SAu2L5 | SAu3L5 |

FIG. 10C

POWER CONSUMPTION USER REQUIREMENT REWARD CONVERSION INFORMATION URPu

| | BOUNDARY VALUE | | | SCORE | | |
|---|---|---|---|---|---|---|
| | Pu1 | Pu2 | | SPu1 | SPu2 | SPu3 |
| LEVEL1 | Pu1L1 | Pu2L1 | | SPu1L1 | SPu2L1 | SPu3L1 |
| LEVEL2 | Pu1L2 | Pu2L2 | | SPu1L2 | SPu2L2 | SPu3L2 |
| LEVEL3 | Pu1L3 | Pu2L3 | | SPu1L3 | SPu2L3 | SPu3L3 |
| LEVEL4 | Pu1L4 | Pu2L4 | | SPu1L4 | SPu2L4 | SPu3L4 |
| LEVEL5 | Pu1L5 | Pu2L5 | | SPu1L5 | SPu2L5 | SPu3L5 |

FIG. 10D

RESPONSIVENESS USER REQUIREMENT REWARD CONVERSION INFORMATION URRu

SPEED USER REQUIREMENT REWARD CONVERSION INFORMATION URVu

| | BOUNDARY VALUE | | SCORE | | |
|---|---|---|---|---|---|
| | Vu1 | Vu2 | SVu1 | SVu2 | SVu3 |
| LEVEL1 | Vu1rL1 | Vu2rL1 | SVu1rL1 | SVu2rL1 | SVu3rL1 |
| LEVEL2 | Vu1rL2 | Vu2rL2 | SVu1rL2 | SVu2rL2 | SVu3rL2 |
| LEVEL3 | Vu1rL3 | Vu2rL3 | SVu1rL3 | SVu2rL3 | SVu3rL3 |
| LEVEL4 | Vu1rL4 | Vu2rL4 | SVu1rL4 | SVu2rL4 | SVu3rL4 |
| LEVEL5 | Vu1rL5 | Vu2rL5 | SVu1rL5 | SVu2rL5 | SVu3rL5 |

ACCELERATION USER REQUIREMENT REWARD CONVERSION INFORMATION URAu

| | BOUNDARY VALUE | | SCORE | | |
|---|---|---|---|---|---|
| | Au1 | Au2 | SAu1 | SAu2 | SAu3 |
| LEVEL1 | Au1rL1 | Au2rL1 | SAu1rL1 | SAu2rL1 | SAu3rL1 |
| LEVEL2 | Au1rL2 | Au2rL2 | SAu1rL2 | SAu2rL2 | SAu3rL2 |
| LEVEL3 | Au1rL3 | Au2rL3 | SAu1rL3 | SAu2rL3 | SAu3rL3 |
| LEVEL4 | Au1rL4 | Au2rL4 | SAu1rL4 | SAu2rL4 | SAu3rL4 |
| LEVEL5 | Au1rL5 | Au2rL5 | SAu1rL5 | SAu2rL5 | SAu3rL5 |

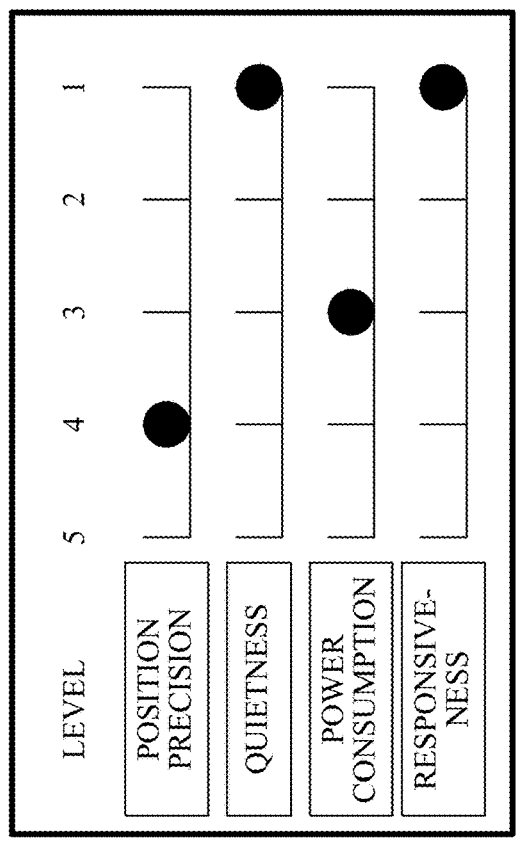
FIG. 11A1
FIG. 11A2

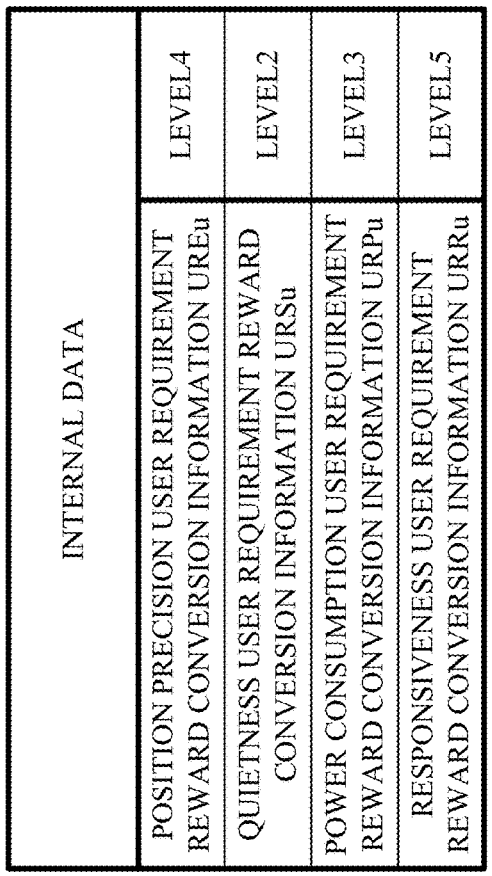
FIG. 12A1
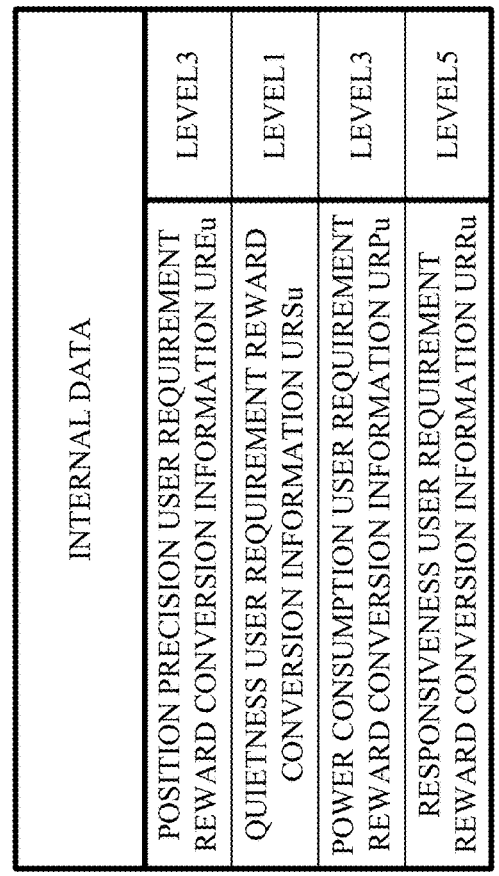
FIG. 12A2
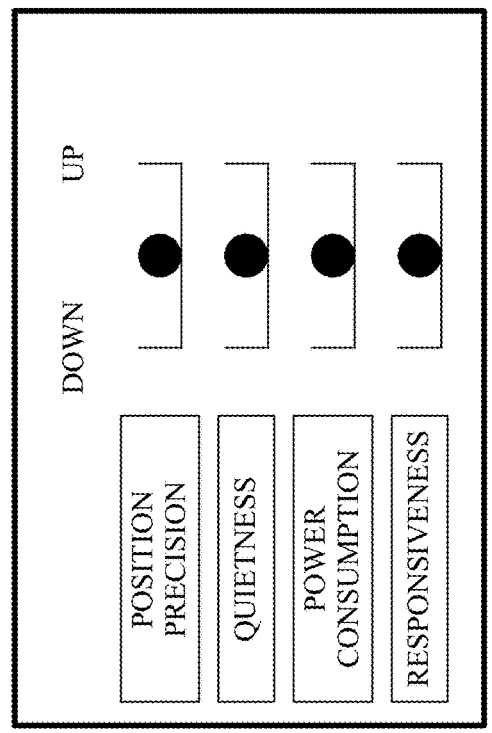
FIG. 12B1
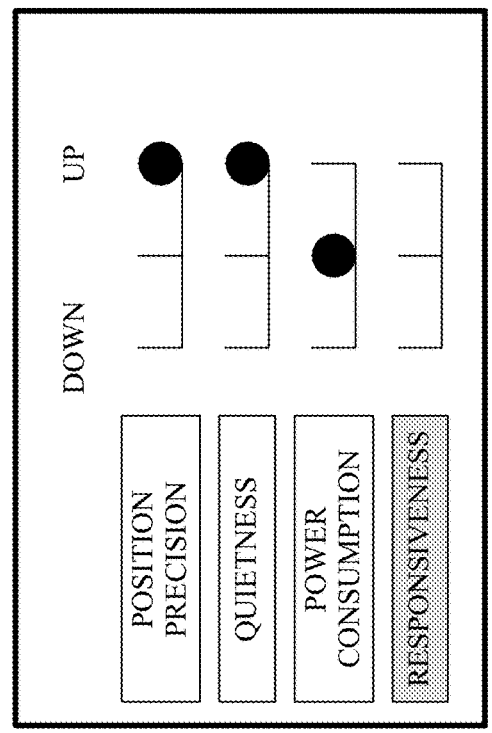
FIG. 12B2

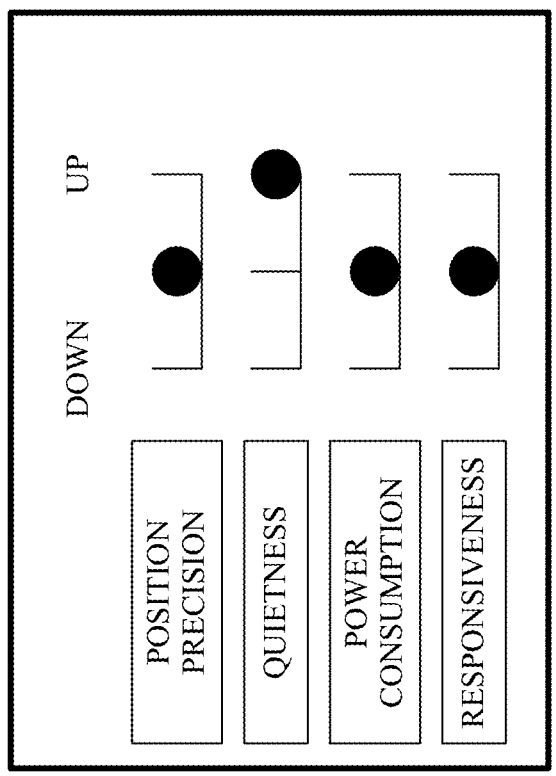
FIG. 12C2
FIG. 12C1

FIG. 13A1

| [STILL IMAGE MODE] | DOWN | UP |
|---|---|---|
| POSITION PRECISION | ● | |
| QUIETNESS | ● | |
| POWER CONSUMPTION | ● | |
| RESPONSIVENESS | ● | |

FIG. 13A2

| INTERNAL DATA | STILL IMAGE MODE | MOTION IMAGE MODE |
|---|---|---|
| POSITION PRECISION USER REQUIREMENT REWARD CONVERSION INFORMATION UREu | LEVEL1 | LEVEL3 |
| QUIETNESS USER REQUIREMENT REWARD CONVERSION INFORMATION URSu | LEVEL5 | LEVEL1 |
| POWER CONSUMPTION USER REQUIREMENT REWARD CONVERSION INFORMATION URPu | LEVEL4 | LEVEL2 |
| RESPONSIVENESS USER REQUIREMENT REWARD CONVERSION INFORMATION URRu | LEVEL2 | LEVEL4 |

FIG. 13B1

| [STILL IMAGE MODE] | DOWN | UP |
|---|---|---|
| POSITION PRECISION | ● | |
| QUIETNESS | ● | |
| POWER CONSUMPTION | | ● |
| RESPONSIVENESS | ● | |

FIG. 13B2

| INTERNAL DATA | STILL IMAGE MODE | MOTION IMAGE MODE |
|---|---|---|
| POSITION PRECISION USER REQUIREMENT REWARD CONVERSION INFORMATION UREu | LEVEL1 | LEVEL3 |
| QUIETNESS USER REQUIREMENT REWARD CONVERSION INFORMATION URSu | LEVEL5 | LEVEL1 |
| POWER CONSUMPTION USER REQUIREMENT REWARD CONVERSION INFORMATION URPu | LEVEL3 | LEVEL2 |
| RESPONSIVENESS USER REQUIREMENT REWARD CONVERSION INFORMATION URRu | LEVEL2 | LEVEL4 |

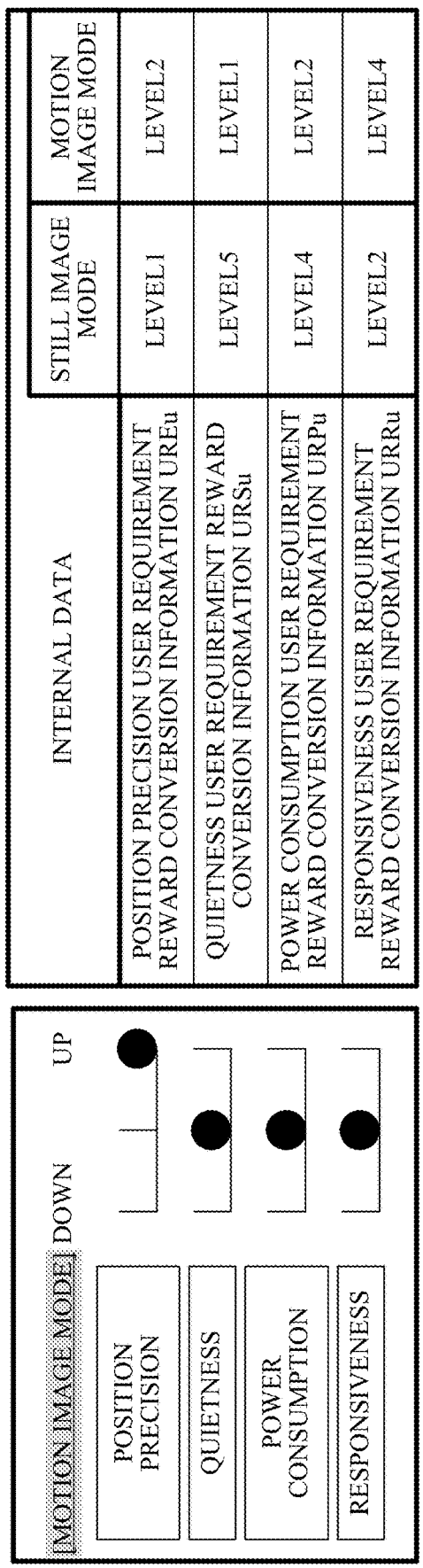
FIG. 13C2
FIG. 13C1

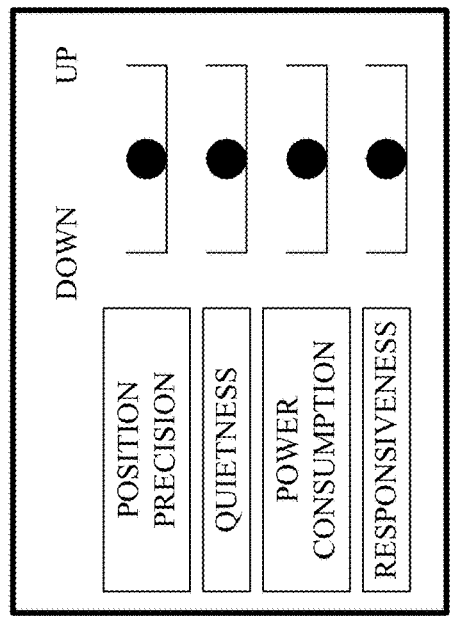

FIG. 14A1

| INTERNAL DATA | REQUIRE-MENT LEVEL | PRIORITY WEIGHT |
|---|---|---|
| POSITION PRECISION USER REQUIREMENT REWARD CONVERSION INFORMATION UREu | LEVEL1 | 1 |
| QUIETNESS USER REQUIREMENT REWARD CONVERSION INFORMATION URSu | LEVEL5 | 1 |
| POWER CONSUMPTION USER REQUIREMENT REWARD CONVERSION INFORMATION URPu | LEVEL4 | 2 |
| RESPONSIVENESS USER REQUIREMENT REWARD CONVERSION INFORMATION URRu | LEVEL2 | 1 |

FIG. 14A2

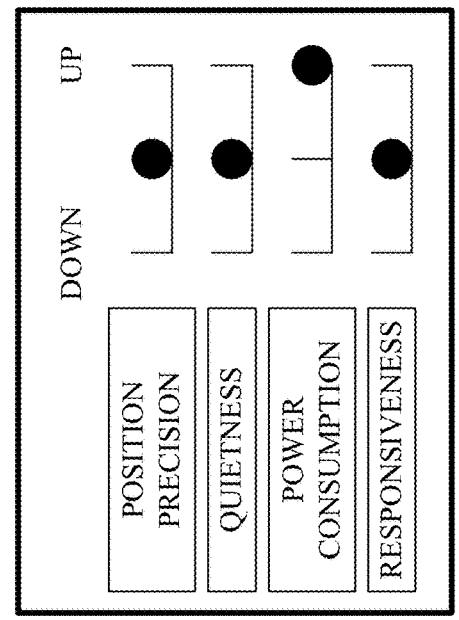

FIG. 14B1

| INTERNAL DATA | REQUIRE-MENT LEVEL | PRIORITY WEIGHT |
|---|---|---|
| POSITION PRECISION USER REQUIREMENT REWARD CONVERSION INFORMATION UREu | LEVEL1 | 1 |
| QUIETNESS USER REQUIREMENT REWARD CONVERSION INFORMATION URSu | LEVEL5 | 1 |
| POWER CONSUMPTION USER REQUIREMENT REWARD CONVERSION INFORMATION URPu | LEVEL2 | 2 |
| RESPONSIVENESS USER REQUIREMENT REWARD CONVERSION INFORMATION URRu | LEVEL2 | 1 |

| | DOWN | UP |
|---|---|---|
| POSITION PRECISION | ● | |
| QUIETNESS | ● | |
| POWER CONSUMPTION | ● | |
| RESPONSIVENESS | ● | |

FIG. 15A2

| INTERNAL DATA | REQUIRE-MENT LEVEL | PRIORITY WEIGHT |
|---|---|---|
| POSITION PRECISION USER REQUIREMENT REWARD CONVERSION INFORMATION UREu | LEVEL1 | 1 |
| QUIETNESS USER REQUIREMENT REWARD CONVERSION INFORMATION URSu | LEVEL2 | 2 |
| POWER CONSUMPTION USER REQUIREMENT REWARD CONVERSION INFORMATION URPu | LEVEL4 | 1 |
| RESPONSIVENESS USER REQUIREMENT REWARD CONVERSION INFORMATION URRu | LEVEL2 | 3 |

FIG. 15B1

| | DOWN | UP |
|---|---|---|
| POSITION PRECISION | ● | |
| QUIETNESS | ● | |
| POWER CONSUMPTION | ● | |
| RESPONSIVENESS | | ● |

FIG. 15B2

| INTERNAL DATA | REQUIRE-MENT LEVEL | PRIORITY WEIGHT |
|---|---|---|
| POSITION PRECISION USER REQUIREMENT REWARD CONVERSION INFORMATION UREu | LEVEL2 | 1 |
| QUIETNESS USER REQUIREMENT REWARD CONVERSION INFORMATION URSu | LEVEL2 | 2 |
| POWER CONSUMPTION USER REQUIREMENT REWARD CONVERSION INFORMATION URPu | LEVEL5 | 1 |
| RESPONSIVENESS USER REQUIREMENT REWARD CONVERSION INFORMATION URRu | LEVEL1 | 3 |

OPTICAL APPARATUS AND GENERATING METHOD

BACKGROUND OF THE INVENTION

Field of the Invention

An aspect of the disclosure relates to an optical apparatus and a generating method.

Description of the Related Art

When an optical element such as a lens and a diaphragm (aperture stop) is driven by an actuator in an image pickup apparatus such as a TV camera and a digital camera, the priority of the driving performance such as the driving speed, the position precision, the power consumption, and the quietness can change depending on various factors such as a condition of an object, required focus precision, an imaging environment, and an imaging time. Japanese Patent Laid-Open No. 2007-006305 discloses a lens apparatus that can drive an optical element more quietly by limiting a driving speed and a driving acceleration.

In order to drive the optical element according to the user's requirement, a machine learning model obtained by machine learning based on the user's requirement can be used. It is difficult for the user to properly set a reward for the machine learning.

SUMMARY OF THE DISCLOSURE

An aspect of the disclosure provides, for example, an optical apparatus beneficial in generation of reward information for generating a machine learning model.

An optical apparatus according to one aspect of the disclosure includes a setting unit configured for a user to set a requirement relating to driving of an optical element by an actuator, and a processor configured to generate reward information for generating a machine learning model for controlling the driving, based on a level of the requirement. The setting unit is configured for the user to input a change of the level of the requirement.

Another aspect of the disclosure will become apparent from the following description of exemplary embodiments with reference to the attached drawings.

BRIEF DESCRIPTION OF THE DRAWINGS

FIGS. 8A1 to 8D2 illustrate reward information according to the first embodiment.

FIG. 9 illustrates a data structure of apparatus constraint reward information and user requirement reward information according to the first embodiment.

FIGS. 10A to 10D illustrate a data structure of user requirement reward conversion information according to the first embodiment.

FIGS. 11A1 and 11A2 illustrate a relationship between a user requirement input image and internal data of a user requirement according to the first embodiment.

FIGS. 12A1 to 12C2 illustrate another relationship between the user requirement input image and the internal data of the user requirement according to the first embodiment.

FIGS. 13A1 to 13C2 illustrate a relationship between a user requirement input image and internal data of a user requirement according to a second embodiment.

FIGS. 14A1 to 14B2 illustrate a relationship between a user requirement input image and internal data of a user requirement according to a third embodiment.

FIGS. 15A1 to 15B2 illustrate another relationship between the user requirement input image and the internal data of the user requirement according to the third embodiment.

DESCRIPTION OF THE EMBODIMENTS

Referring now to the accompanying drawings, a description will be given of embodiments according to the present invention.

First Embodiment

<System Configuration>

Figure 1:
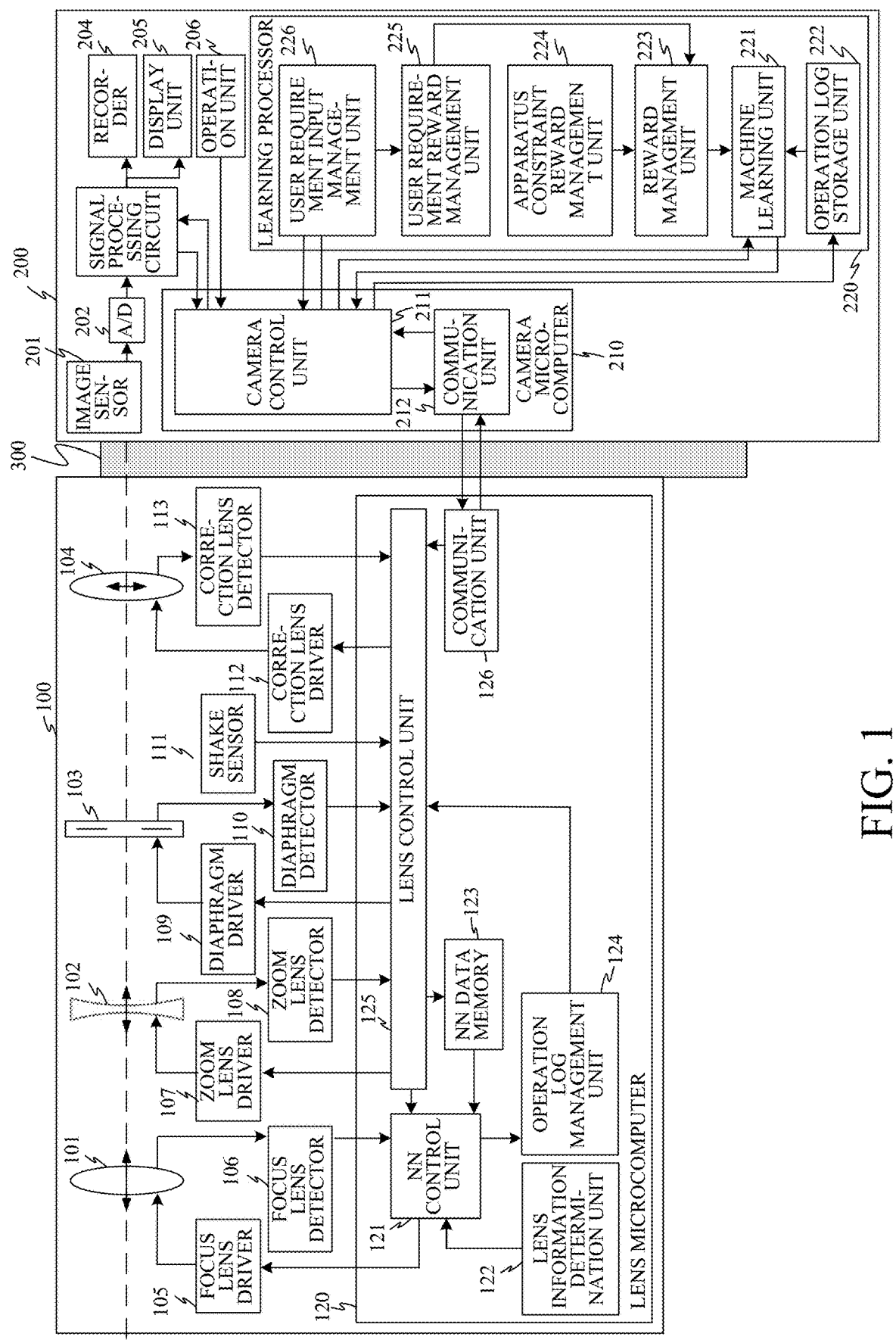
FIG. 1 is a block diagram showing a configuration of a camera system according to a first embodiment.

FIG. 1 illustrates a configuration of an imaging system (referred to as a camera system hereinafter) according to a first embodiment of the present invention. The camera system includes an image pickup apparatus (referred to as a camera body hereinafter) 200 as an optical apparatus and a lens apparatus (simply referred to as a lens hereinafter) 100 as an accessory attachable to and detachable from the camera body 200. The camera body 200 and the lens 100 are mechanically and electrically connected via a mount 300, which serves as a connecting mechanism. The camera body 200 supplies the power to the lens 100 via an unillustrated power supply terminal portion provided to the mount 300. The camera body 200 and the lens 100 communicate with each other via an unillustrated communication terminal portion provided on the mount 300. In this embodiment, the lens apparatus and the camera body are connected to each other via the mount, but the lens may be integrated with the camera body.

The lens 100 includes an imaging optical system that forms an image of light from an unillustrated object. The imaging optical system includes a focus lens 101 that provides focusing, a zoom lens 102 that varies a magnification, a diaphragm unit 103 that adjusts a light amount, and a correction lens 104 that provides an image stabilization. Each of the focus lens 101, the zoom lens 102, the diaphragm unit 103, and the correction lens 104 corresponds to optical element. The focus lens 101 and the zoom lens 102 are held by an unillustrated lens holding frame. The lens holding frame is movably guided in an optical axis direction, which is a direction in which the optical axis of the imaging optical system (indicated by a broken line in the figure) extends by an unillustrated guide shaft.

The focus lens 101 is driven in the optical axis direction by a focus lens driver 105, and its position is detected by a focus lens detector 106. The zoom lens 102 is driven in the optical axis direction by a zoom lens driver 107, and its position is detected by a zoom lens detector 108.

The diaphragm unit 103 adjusts a light amount when a plurality of diaphragm blades are driven in opening or closing directions through a diaphragm driver 109. The F-number (aperture value) of the diaphragm unit 103 is detected by a diaphragm detector 110.

The correction lens 104 is driven by a correction lens driver 112 in a direction orthogonal to the optical axis to reduce (correct) image shakes caused by camera shakes such as manual shakes. The position of the correction lens 104 is detected by a correction lens detector 113.

Each of the focus lens driver 105, the zoom lens driver 107, the diaphragm driver 109, and the correction lens driver 112 includes an actuator such as a vibration type motor, a DC motor, a stepping motor, and a voice coil motor, and a driving circuit thereof.

Each of the focus lens detector 106, the zoom lens detector 108, the diaphragm detector 110, and the correction lens detector 113 includes a position sensor such as a potentiometer or an encoder. If the driver includes an actuator such as a stepping motor that can acquire a driving amount by counting the number of applied driving pulses, the detector may include a sensor such as a photo-interrupter that detects an initial position and a counter that counts the number of driving pulses.

A shake sensor 111 includes a gyro sensor or the like, and detects shakes (camera shakes) of the lens 100 due to manual shakes or the like.

A lens microcomputer (referred to as a lens microcomputer hereinafter) 120 includes a CPU or the like, and includes an NN (neural network) control unit (controller) 121, a lens information determination unit 122, an NN data memory 123, an operation log management unit 124, a lens control unit 125, and a communication unit 126.

The NN control unit 121 controls a position of the focus lens 101. An NN algorithm is installed in the NN control unit 121. The NN control unit 121 generates a focus driving signal for driving the focus lens 101 by the NN algorithm using machine learning parameters. The lens information determination unit 122 determines the lens information used by the NN control unit 121. The NN data memory 123 stores a weight used for the NN algorithm. The operation log management unit 124 manages operation log information on a driving control of the focus lens 101. The NN algorithm, weight, lens information, and operation log information will be described later.

The lens control unit 125 controls the positions of the zoom lens 102, the diaphragm unit 103, and the correction lens 104, and controls a transmission of information between the lens 100 and the camera body 200. The lens control unit 125 generates a driving command by a PID (Proportional-Integral-Differential) control according to a deviation between a target position or speed of the controlled object and a corresponding one of the current position and speed, for example. The communication unit 126 communicates with the camera body 200.

The camera body 200 includes an image sensor 201, an A/D conversion circuit 202, a signal processing circuit 203, a recorder 204, a display unit 205, an operation unit 206, a camera microcomputer (referred to as a camera microcomputer hereinafter) 210, and a learning processor 220.

The image sensor 201 is a photoelectric conversion element such as a CCD sensor or a CMOS sensor that converts an object image formed by light incident from the imaging optical system in the lens 100 into an electric signal. The A/D conversion circuit 202 converts the electric signal output from the image sensor 201 into a digital signal. The signal processing circuit 203 converts the digital signal output from the A/D conversion circuit 202 into video data. The recorder 204 records the video data. The display unit 205 includes a display device such as an LCD panel or an organic EL panel, and displays an image corresponding to the video data and a user requirement input image described later. The operation unit 206 has various operation members operable by the user.

The camera microcomputer 210 includes a CPU and the like, and controls the camera body 200. The camera microcomputer 210 has a camera control unit 211 and a communication unit 212. The camera control unit 211 issues a driving command to the lens 100 based on the video data from the signal processing circuit 203 and the operation information from the operation unit 206. The control unit 211 controls transmissions of commands and information to the learning processor 220. The communication unit 212 transmits, as a control command, the driving command from the camera control unit 211 to the lens 100, and receives information from the lens 100.

The learning processor (processing unit) 220 includes a processor (CPU, GPU, etc.) that serves as a computer and a storage device (ROM, RAM, HDD, etc.). The processor executes processing of a machine learning unit (generating unit) 221, an apparatus constraint reward management unit 224, a reward management unit 223, a user requirement reward management unit 225, and a user requirement input management unit (display control unit) 226 according to a computer program. The storage device stores the computer program for controlling them and operation log information stored by the operation log storage unit 222. The storage device further stores reward information managed by the reward management unit 223, apparatus constraint reward information managed by the apparatus constraint reward management unit 224, and user requirement reward information and user requirement reward conversion information managed by the user requirement reward management unit 225. The reward information, the apparatus constraint reward information, the user requirement reward information, and the user requirement reward conversion information will be described later.

<Focus Control>

The camera control unit 211 performs autofocus (AF) control (simply referred to as a focus control hereinafter) that controls driving of the focus lens 101 using the video data output from the signal processing circuit 203. More specifically, the camera control unit 211 controls the position of the focus lens 101 so as to maximize a contrast difference in the video data and focuses on the object. The camera control unit 211 outputs the target position of the focus lens 101 to the communication unit 212 as a focus driving command. The communication unit 212 converts the focus driving command into a control command, and transmits it to the lens 100.

The communication unit 126 in the lens 100 converts the received control command into a focus driving command, and outputs it to the NN control unit 121 via the lens control unit 125. The NN control unit 121 generates a focus driving signal using the learned weights stored in the NN data memory 123 in response to the focus driving command, and outputs it to the focus lens driver 105 to drive the focus lens 101. The method by which the NN control unit 121 generates the focus driving signal will be described later.

<Diaphragm Control>

The camera control unit 211 performs an exposure control that controls driving of the diaphragm unit 103 using the video data output from the signal processing circuit 203. More specifically, the camera control unit 211 determines a target F-number (target position of the diaphragm blade) so that a luminance value of the video data becomes constant, and issues a diaphragm driving command indicating the target F-number to the communication unit 212. The communication unit 212 converts the diaphragm driving command into a control command, and transmits it to the lens 100. The communication unit 126 in the lens 100 converts the received control command into a diaphragm driving command, and outputs it to the lens control unit 125. The lens control unit 125 generates a diaphragm driving signal based on the diaphragm driving command and the current F-number detected by the diaphragm detector 110, outputs it to the diaphragm driver 109, and drives the diaphragm unit 103.

<Zoom Control>

When the user performs a zoom operation through the operation unit 206, the camera control unit 211 outputs a zoom driving command indicating a zoom driving amount corresponding to a zoom operation amount output from the operation unit 206, to the communication unit 212. The communication unit 212 converts the zoom driving command into a control command, and transmits it to the lens 100. The communication unit 126 in the lens 100 converts the received control command into a zoom driving command, and outputs it to the lens control unit 125. The lens control unit 125 generates a zoom driving signal based on the zoom driving command and the current position of the zoom lens 102 detected by the zoom lens detector 108, and outputs it to the zoom lens driver 107 to drive the zoom lens 102.

<Image Stabilization Control>

The lens control unit 125 determines the target position of the correction lens 104 so as to cancel image shakes caused by the camera shakes obtained by the output signal from the shake sensor 111. The lens control unit 125 generates a correction driving signal based on the target position and the current position of the correction lens 104 detected by the correction lens detector 113, outputs it to the correction lens driver 112, and drives the correction lens 104.

<Matters Required for Focus Control>

The focus control has four requirements including position precision, a driving speed, a power consumption, and quietness of the focus lens 101, and needs a control of driving of the focus lens 101 in a well-balance manner of these requirements.

Figure 2A:
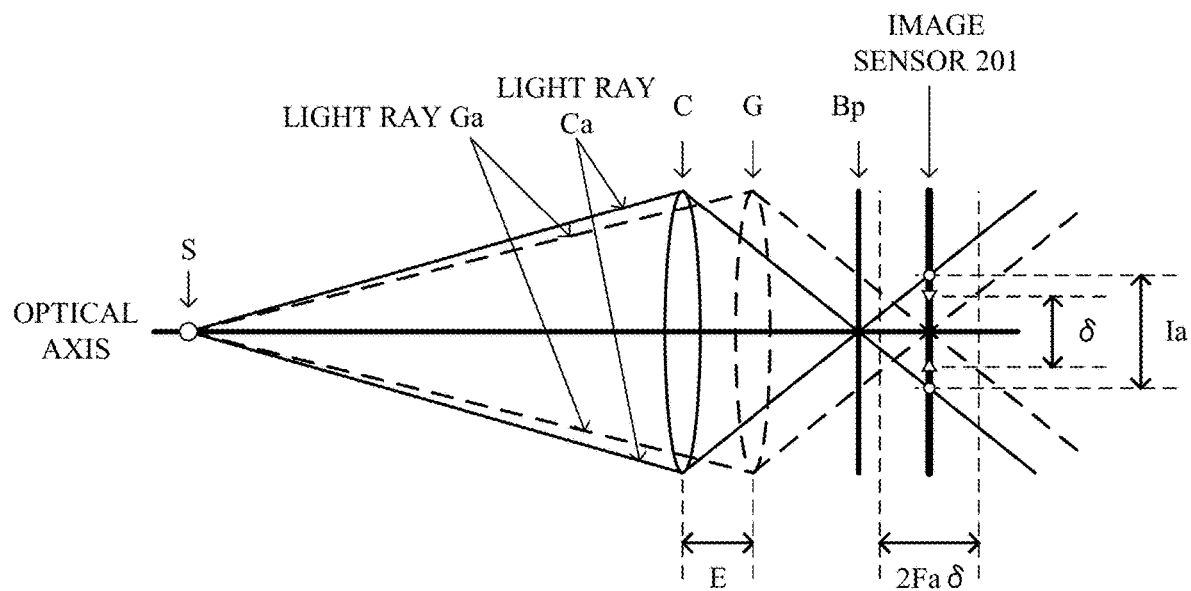
FIGS. 2A and 2B illustrate driving position precision required for a focus control.
Figure 2B:
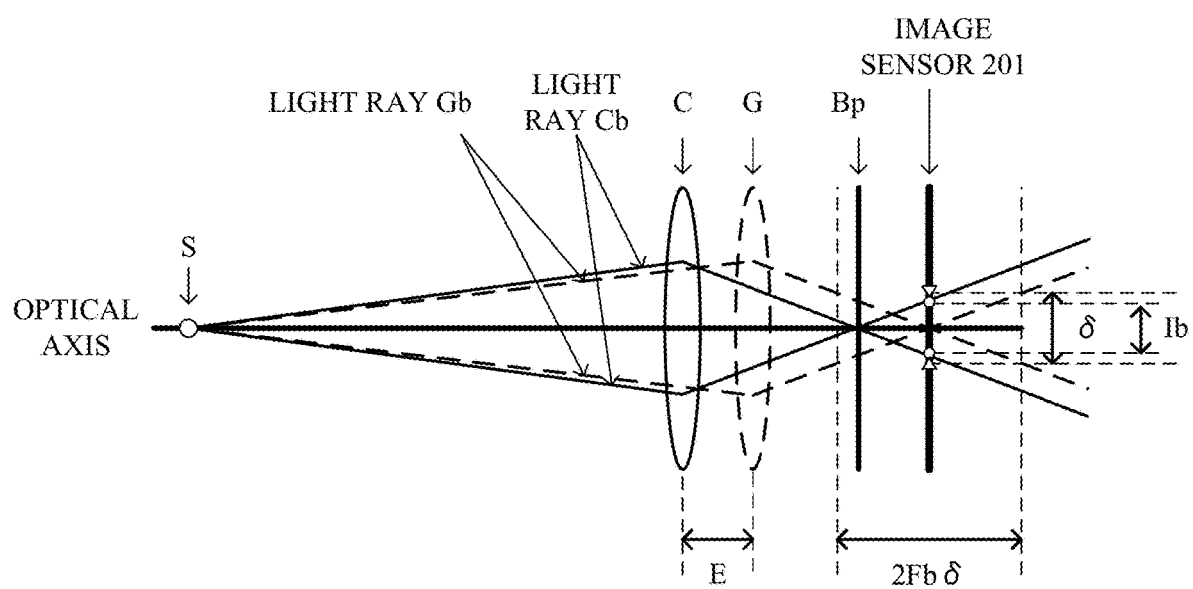

The position precision indicates how precisely the focus lens 101 can be driven to the target position. FIGS. 2A and 2B illustrate a relationship between the focus lens and the focus position when the depth of focus is shallow and when the depth of focus is deep, respectively. These figures illustrate the above relationship when the imaging optical system has the same configuration but a different F-number.

<Position Precision>

A target position G indicates a position of the focus lens in which an object image (referred to as a point object image hereinafter), which is an optical image of a point object S as the object on the optical axis, is imaged on the image sensor 201 in an in-focus state. An actual position C of the focus lens indicates a position of the focus lens after the focus lens is driven to the target position G. The actual position C is located on the point object S side of the target position G by a control error E. A focus position Bp indicates an imaging position of the point object image when the focus lens is located at the actual position C. A circle of confusion δ is a circle of confusion of the image sensor 201.

An F-number Fa in FIG. 2A is smaller (brighter) than an F-number Fb in FIG. 2B. Thus, a depth of focus 2Faδ in FIG. 2A is narrower than a depth of focus 2Fbδ in FIG. 2B. Light rays Ca and Ga in FIG. 2A are the outermost light rays from the point object S passing through the focus lens located at the actual position C and the target position G, respectively. Light rays Cb and Gb in FIG. 2B are the outermost light rays from the point object S passing through the focus lens located at the actual position C and the target position G, respectively. In FIG. 2A, a point image diameter Ia indicates a diameter of the point object image on the image sensor 201 when the focus lens is located at the actual position C. In FIG. 2B, a point image diameter Ib indicates a diameter of the point object image on the image sensor 201 when the focus lens is located at the actual position C.

In FIG. 2A, when the focus lens is located at the actual position C, the focus position Bp is located out of a range of the depth of focus 2Faδ. The point image diameter Ia is larger than the circle of confusion δ, and the point object image does not fit in the central pixel of the image sensor 201 and spreads to the pixels next to it (that is, the light rays from the point object S enter the center pixel and adjacent pixels). Therefore, the focus lens located at the actual position C provides a defocus state relative to the point object S.

On the other hand, in FIG. 2B, when the focus lens is located at the actual position C, the focus position Bp falls within a range of the depth of focus 2Fbδ. The point image diameter Ib is smaller than the circle of confusion δ and is contained within the central pixel of the image sensor 201 (that is, all the light rays from the point object S enter the central pixel). Therefore, the focus lens located at the actual position C provides an in-focus state upon the point object S.

In this way, even when the position precision of the focus lens 101 is the same, the in-focus state is achieved in some cases and is not achieved in other cases depending on the imaging condition such as the F-number. That is, the required position precision of the focus lens 101 changes according to the imaging condition.

<Driving Speed>

The driving speed of the focus lens 101 is a moving amount of the focus lens 101 per unit time. In the following description, the moving amount of the focus lens 101 will be referred to as a lens moving amount, a moving amount of an imaging position (image plane) in the optical axis direction will be referred to as a focus moving amount, and a moving speed of the image plane will be referred to as a focus moving speed. A lens moving amount is proportional to the focus moving amount. This constant of proportionality is called a focus sensitivity. The focus sensitivity changes depending on the positional relationship among a plurality of lenses constituting the imaging optical system. A focus moving amount $\Delta Bp$, a focus sensitivity $Se$, and a lens moving amount $\Delta P$ have a relationship shown in the expression (1).

$$\Delta Bp = Se \times \Delta P \tag{1}$$

Figure 3A:
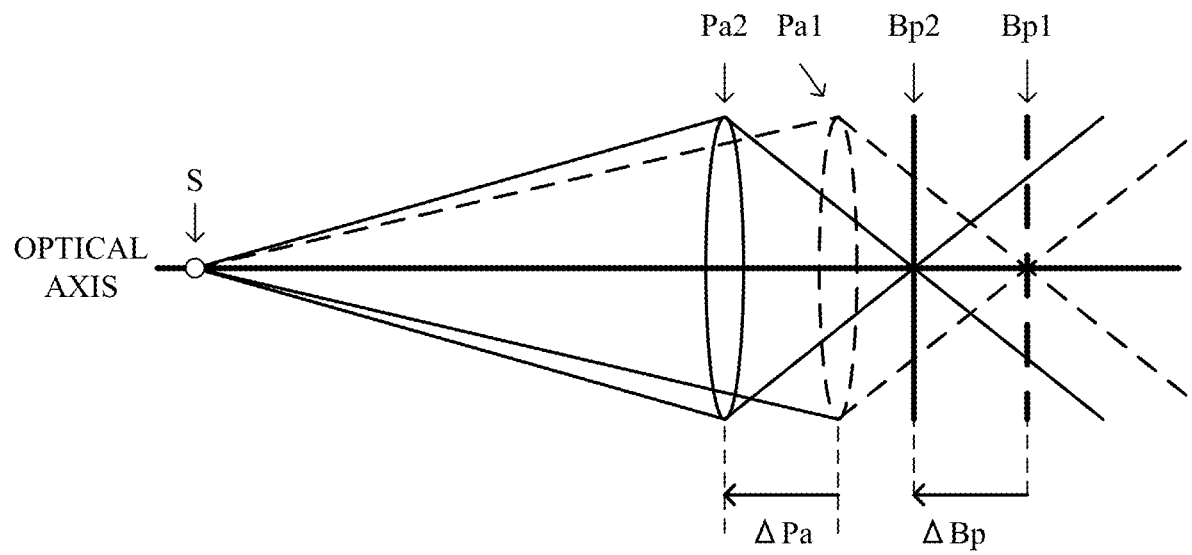
FIGS. 3A and 3B illustrate a driving speed required for the focus control.
Figure 3B:
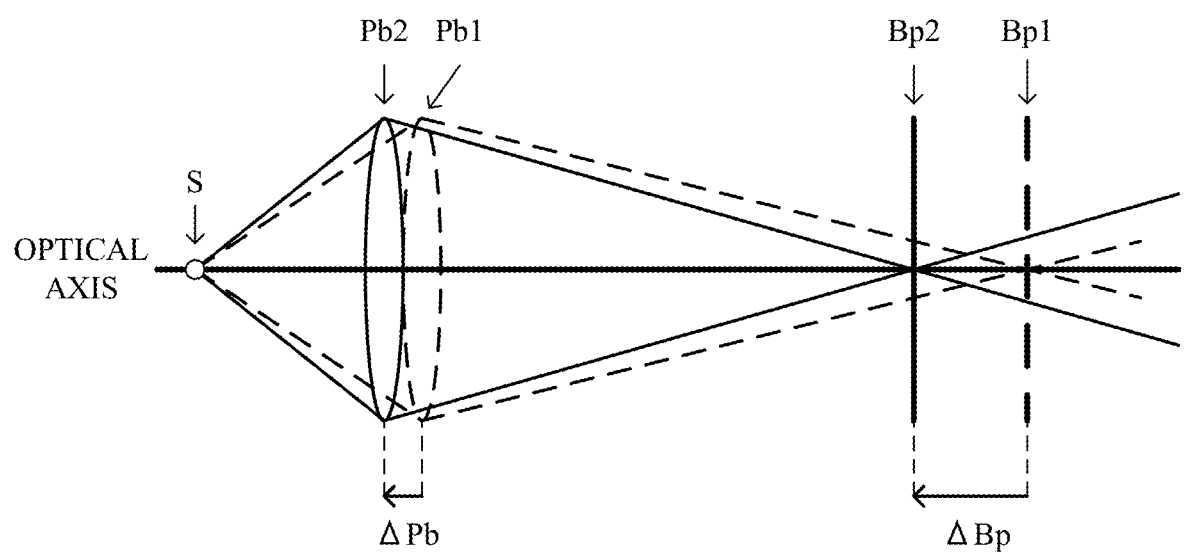

FIGS. 3A and 3B illustrate a relationship between the position of the focus lens and the focus position when (A)

the focus sensitivity Se is large and (B) the focus sensitivity Se is small, respectively. FIGS. 3A and 3B illustrate a case where the imaging optical system has the same configuration, but a different distance from the focus lens (that is, the imaging optical system) to the point object S.

In FIG. 3A, in order to move the focus position from Bp1 to Bp2, it is necessary to move the position of the focus lens from Pa1 to Pa2. The lens moving amount ΔPa and the focus moving amount ΔBp have the relationship shown in the expression (1).

In FIG. 3B, in order to move the focus position from Bp1 to Bp2, it is necessary to move the position of the focus lens from Pb1 to Pb2. The lens moving amount ΔPb and the focus moving amount ΔBp also have the relationship shown in the expression (1).

Since the focus sensitivity in FIG. 3A is smaller than that in FIG. 3B, the lens moving amount ΔPa required to obtain the same focus moving amount ΔBp is larger in FIG. 3A. That is, in comparison with the case of FIG. 3A, in the case of FIG. 3B, the lens moving amount per unit time can be reduced, so that the focus moving speed is the same even when the driving speed of the focus lens is slowed down.

Thus, the driving speed of the focus lens 101 required to obtain a certain focus moving speed differs depending on the imaging condition. That is, the required driving speed of the focus lens 101 changes according to the imaging condition.

<Power Consumption>

The power consumption, which is the power consumed to drive the focus lens 101, changes according to the driving time, the driving speed, or changes in the driving acceleration of the focus lens 101. The longer the driving time is, the higher the driving speed is, or the larger the larger the change in the driving acceleration is, the higher the power consumption is.

Reducing the power consumption can effectively utilize the battery capacity of the camera body 200, increase the number of images that can be captured with a single electric charge, and make the battery smaller.

<Quietness>

The focus lens 101 when driven causes driving noises due to vibrations, frictions, and the like. The driving noise changes according to the driving speed and changes in the driving acceleration. The higher the driving speed is or the larger the change in the driving acceleration is, the louder the driving noise becomes. When the focus lens 101 stops for a long time, no driving noise is generated for a long time.

In the imaging in a quiet place, the driving noise is conspicuous and unnecessary driving noise is recorded in recording a motion image. Therefore, depending on the imaging condition (ambient environment), quiet driving is required to minimize the driving noise generated by driving the focus lens 101.

<Relationship Between Position Precision and Each of Driving Speed, Power Consumption, and Quietness>

Figure 4A:
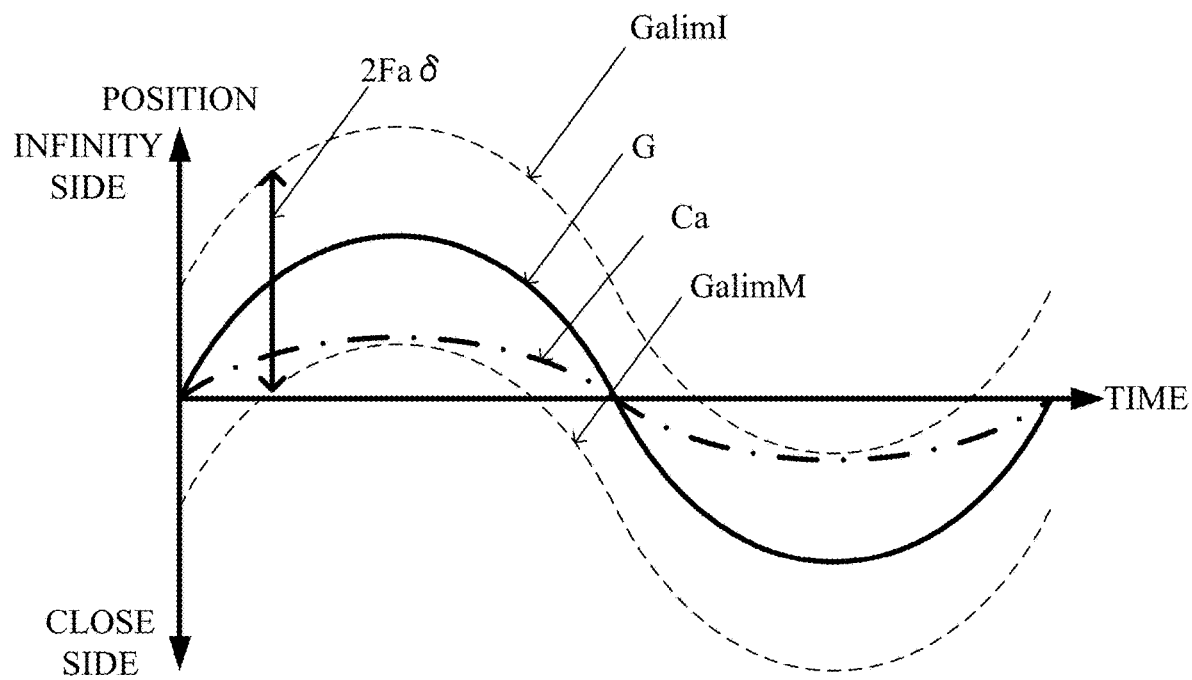
FIGS. 4A and 4B illustrate a relationship between the position precision of a focus lens and each of the driving speed, power consumption, and quietness.
Figure 4B:
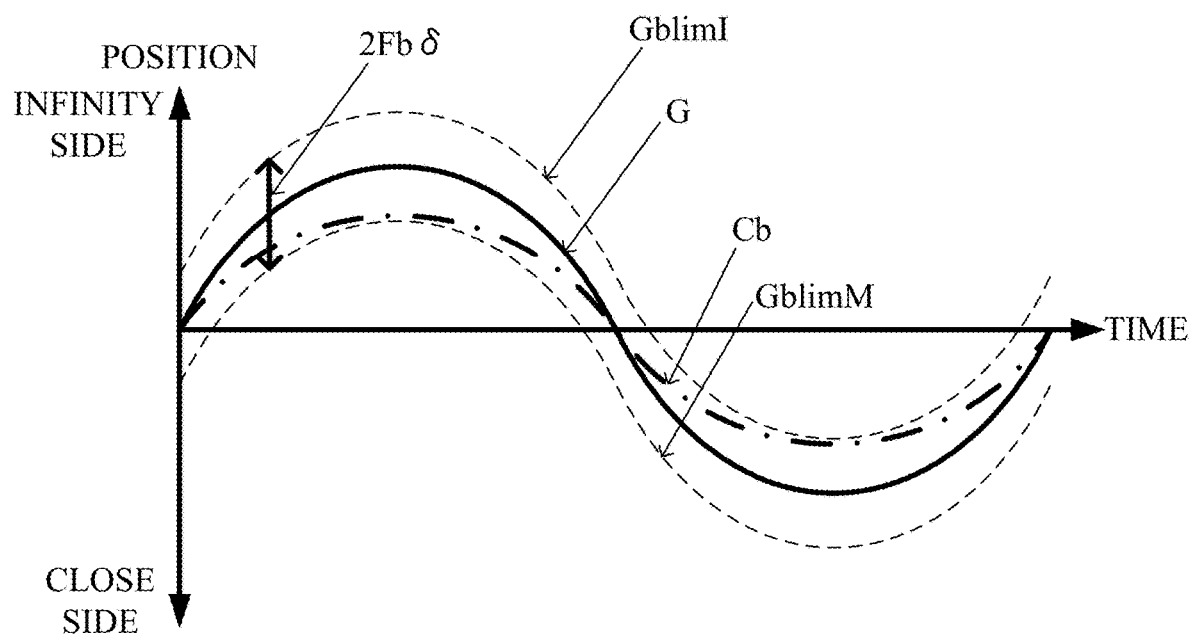

FIGS. 4A and 4B illustrate movements of the focus lens 101 that maintain an in-focus state on a moving object when (A) the depth of focus is shallow and (B) the depth of focus is deep, respectively. An abscissa axis of each figure represents time, and an ordinate axis represents a position of the focus lens 101. As the position of the focus lens 101 moves upward, the object on the infinity side is becomes in focus, and as the position moves downward, the object in the closest side becomes in focus.

The target position G of the focus lens 101 indicates an in-focus position of the focus lens 101 where the focus position is located on the image sensor 201. The depths of focus in FIGS. 4A and 4B are 2Faδ and 2Fbδ, respectively.

In FIG. 4A, GalimI represents an end on the infinity side of the depth of focus which provides the in-focus state around the target position G as a center, and GalimM represents an end on the closest side. In FIG. 4B, GblimI represents an end on the infinity side of the depth of focus around the target position G as a center, and GblimM represents an end on the closest side. Ca and Cb in FIGS. 4A and 4B represents moving loci of the focus lens 101 whose position is controlled so that the object falls within the depth of focus, respectively.

Since the depth of focus is deep in FIG. 4A, the in-focus state on the object is maintained even if the movement of the focus lens 101 is controlled so as to draw a moving locus Ca. On the other hand, since the depth of focus is shallower in FIG. 4B than that in FIG. 4A, if the movement of the focus lens 101 is controlled so as to draw a moving locus Cb having a smaller deviation from the target position G than that in FIG. 4A, the in-focus state on the object is maintained. However, the moving locus Ca in FIG. 4A has a gentler curve than that of the moving locus Cb of FIG. 4B. Therefore, the driving amount and driving speed of the focus lens 101 can be reduced in the case of FIG. 4A than those in the case of FIG. 4B. The focus lens 101 can be driven at a lower speed, a lower power consumption, and more quietly under the imaging condition when the required position precision is low.

<Relationship Between Driving Speed and Each of Position Precision, Power Consumption, and Quietness>

Figure 5A:
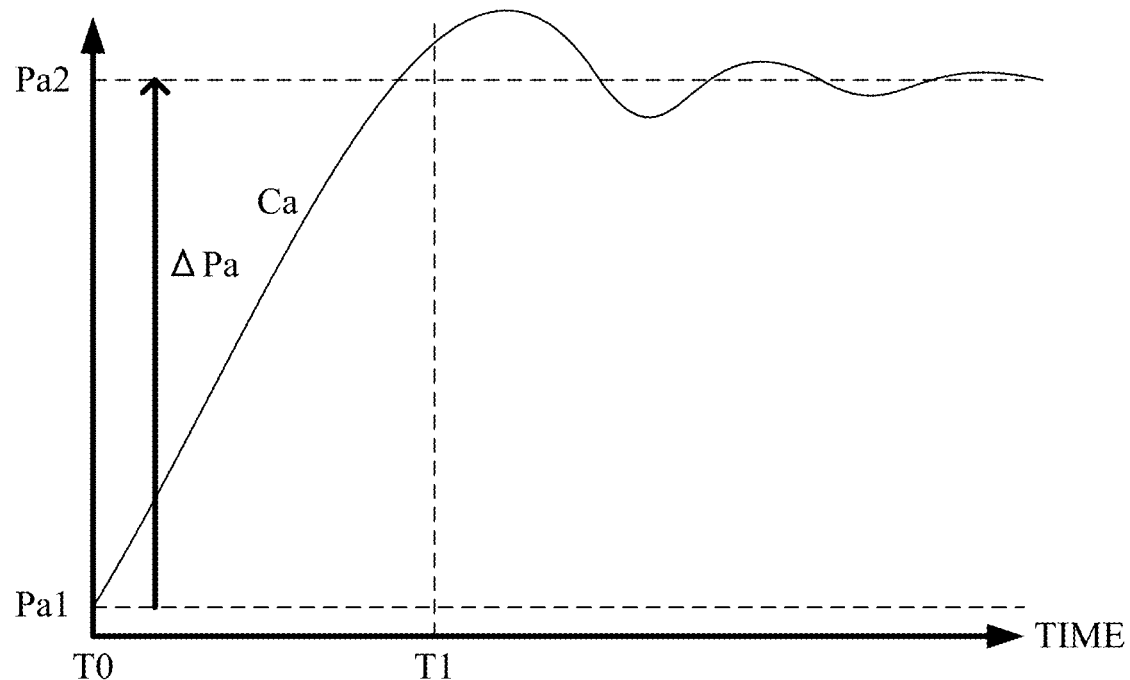
FIGS. 5A and 5B illustrate a relationship between the driving speed of the focus lens, and each of the position precision, power consumption, and quietness.
Figure 5B:
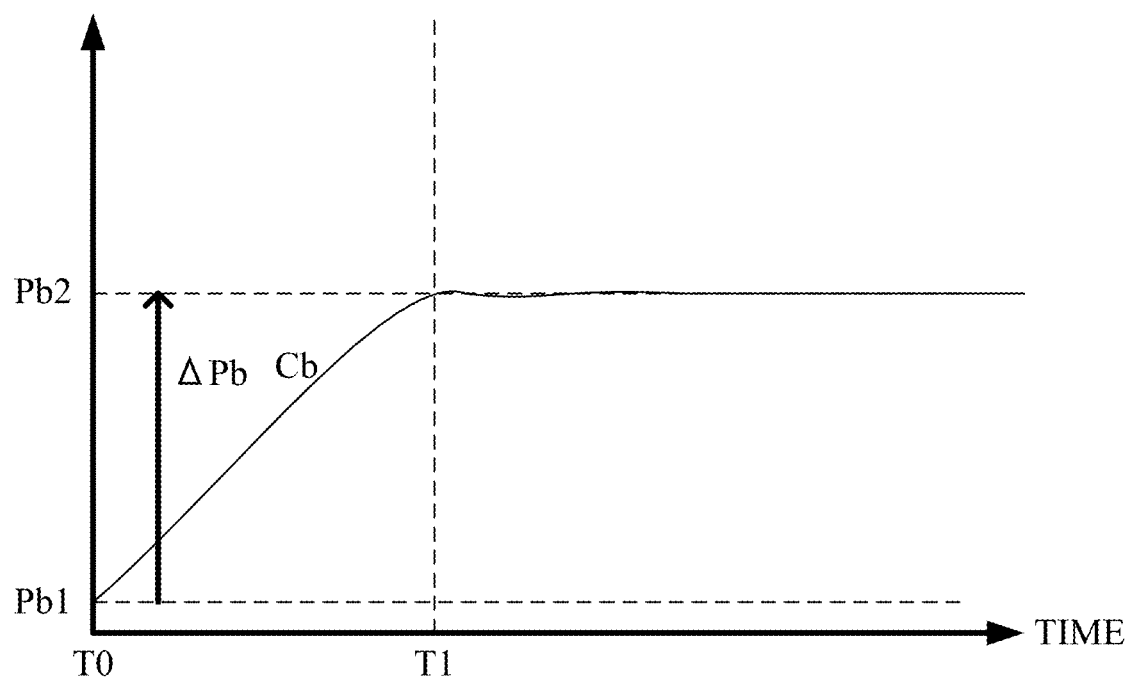

An abscissa axis of FIGS. 5A and 5B represents time, and an ordinate axis represents a position of the focus lens 101. FIG. 5A illustrates a moving locus Ca of the focus lens 101 when the focus lens 101 is driven between times T0 and T1 by a driving amount ΔPa from the position Pa1 to the position Pa2 illustrated in FIG. 3A. FIG. 5B illustrates a moving locus Cb of the focus lens 101 when the focus lens 101 is driven between the times T0 and T1 by a driving amount ΔPb from the position Pb1 to the position Pb2 illustrated in FIG. 3B. As illustrated in FIGS. 3A and 3B, the focus moving amount ΔBp when the focus lens 101 is moved from the position Pa1 to the position Pa2 and the focus moving amount ΔBp when the focus lens 101 moves from the position Pb1 to the position Pb2 are equal to each other. The inclinations of the movement loci Ca and Cb in FIGS. 5A and 5B indicate the driving speed of the focus lens 101.

As understood from FIGS. 5A and 5B, the driving speed of the focus lens 101 for moving the focus position by the same focus moving amount ΔBp from the time T0 to the time T1 is higher in the case of FIG. 5A than that in the case of FIG. 5B. Since the driving speed of the focus lens 101 in the case of FIG. 5A is higher than that in the case of FIG. 5B, it takes a certain amount of time for the focus lens 101 to stabilize after reaching the target position Pa2. On the other hand, since the driving speed of the focus lens 101 in the case of FIG. 5B is lower than that in the case of FIG. 5A, the position of the focus lens 101 stabilizes immediately after reaching the target position Pb2. This affects the position precision of the focus lens 101. Since the focus lens 101 is driven quickly and its change in acceleration is large at the time of stop, the power consumption in the case of FIG. 5A is larger than that in the case of FIG. 5B and the driving noise is also louder. Under the imaging condition where the required driving speed is low, the focus lens 101 can be driven with high position precision, low power consumption, and quietness.

As described above, in order to perform a focus control in a well-balanced manner of the four requirements, it is necessary to use the position precision required for the focus lens 101 and the above lens information for determining the driving speed of the focus lens 101.

The lens information is determined by the lens information determination unit 122. The lens information is information on the influence of the focus control on the captured image, and is, for example, information on the depth of focus and the focus sensitivity. The information on the depth of focus and the focus sensitivity may be information that directly indicates them, or information that can be converted into the depth of focus and the focus sensitivity.

The lens information determination unit 122 determines the depth of focus from the current F-number and information on the circle of confusion. The lens information determination unit 122 determines the focus sensitivity using an unillustrated, previously stored conversion table that shows a relationship among the focus sensitivity, and the positions of the focus lens 101 and the zoom lens 102, based on the positions of the focus lens 101 and the zoom lens 102. Using this lens information, driving of the focus lens 101 is controlled so as to improve the balance of the requirements including the position precision, the driving speed, the power consumption, and the quietness, taking into account the influence of focus control on the captured image. The NN control unit 121 performs the focus control in accordance with the NN algorithm using the lens information.

<NN Algorithm and Weight>

The NN control unit 121 that installed the NN algorithm refers to a weight which is a feature amount and a coupling weight coefficient of the NN recorded in the NN data memory 123, and generates the focus driving signal in accordance with the NN algorithm using the weight. The method of creating the weight will be described later.

Figure 6:
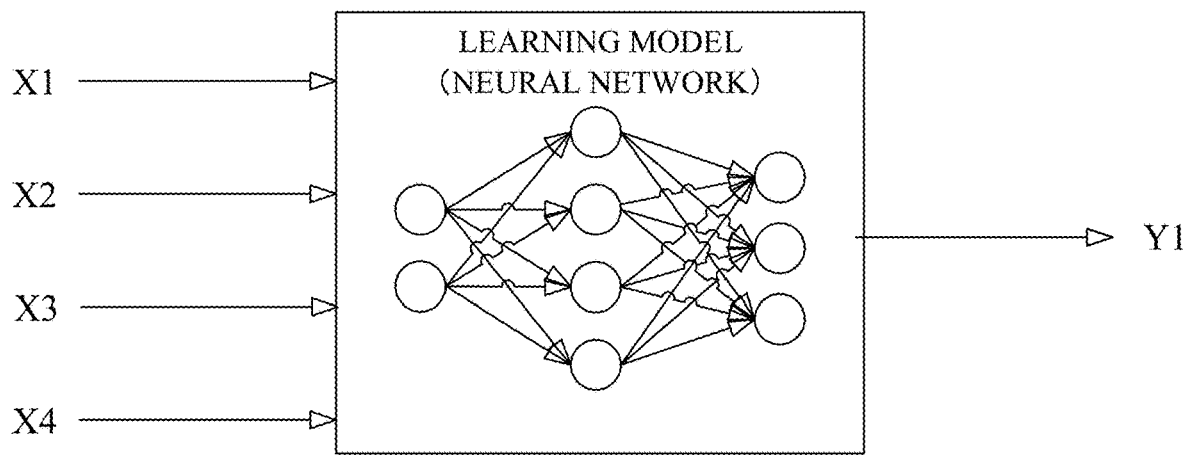
FIG. 6 illustrate inputs and an output of a neural network according to the first embodiment.

FIG. 6 conceptually illustrates an input/output structure of the NN control unit 121 provided with the machine learning model (learned model) using the NN algorithm. X1 is a target position as a focus driving command input from the lens control unit 125. X2 is a current position (actual position) of the focus lens 101 obtained from the focus lens detector 106. X3 is a depth of focus as the lens information, and X4 is a focus sensitivity as the lens information. Y1 is a focus driving signal as an output. Thus, the NN control unit 121 determines (generates) the focus driving signal as the output from the learning model in response to inputs of the target position of the focus lens 101, the current position of the focus lens 101, the depth of focus, and the focus sensitivity.

<Weight Creating Method>

When the user performs an operation indicating an execution of the machine learning through the operation unit 206, the machine learning execution command is transmitted to the machine learning unit 221 via the camera control unit 211. The machine learning unit 221 starts the machine learning in response to the command.

Figure 7:
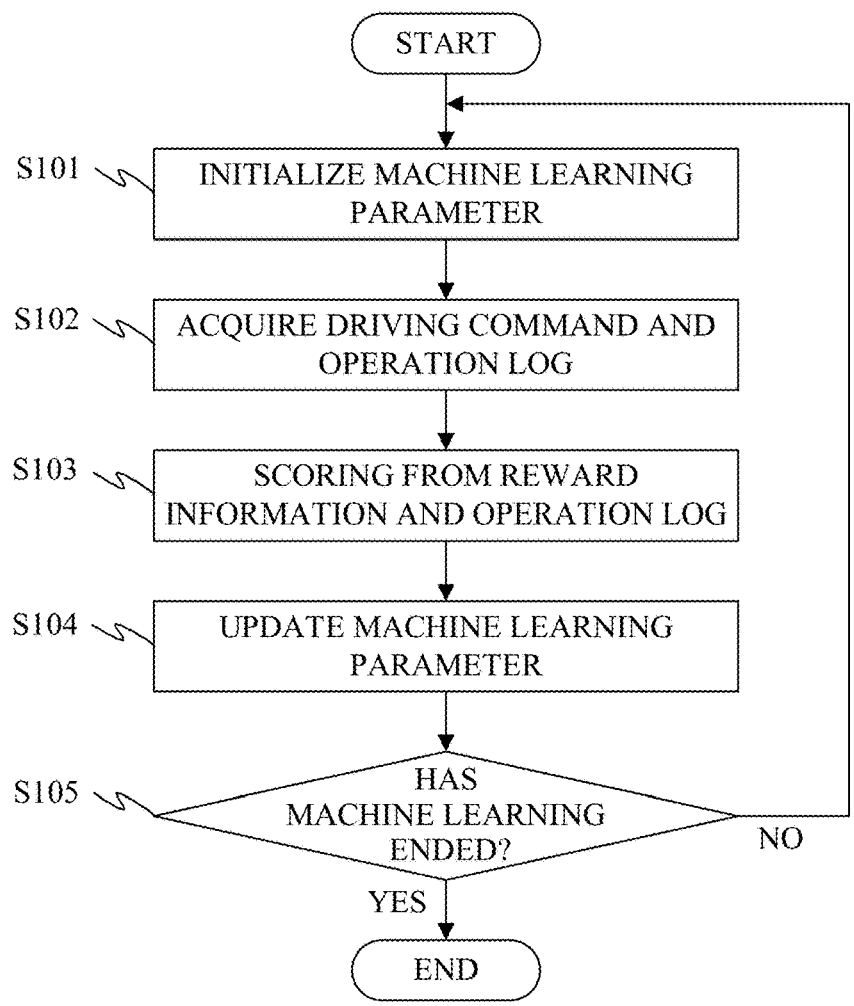
FIG. 7 is a flowchart showing machine learning according to the first embodiment.

A flowchart in FIG. 7 depicts a flow of machine learning. The machine learning unit 221 performs the machine learning in accordance with a computer program. In the step S101, the machine learning unit 221 outputs an initial value of the weight to the camera control unit 211. The camera control unit 211 that has received the initial value of the weight transmits the initial value of the weight to the lens control unit 125. The lens control unit 125 that has received the initial value of the weight sets the initial value of the weight in the NN data memory 123.

Next, in the step S102, the machine learning unit 221 requires the camera control unit 211 to acquire the focus driving command (target position) and the operation log information. Upon receiving the requirement, the camera control unit 211 requires the lens control unit 125 to acquire the focus driving command and the operation log information. The lens control unit 125 that has received the focus driving command acquisition requirement receives the focus driving command output by the machine learning unit 221 from the camera control unit 211, and outputs it to the NN control unit 121. The NN control unit 121 generates a focus driving signal using the weight stored in the NN data memory 123, and controls the driving of the focus lens 101. The machine learning unit 221 stores a specific driving pattern from a start position to a stop position determined in advance for learning, and outputs the focus driving command according to the driving pattern. Instead, the focus control may be executed and the focus driving command may be output.

The lens control unit 125 that has received the operation log information acquisition requirement requires the operation log management unit 124 to output the operation log information. Upon receiving the requirement, the operation log management unit 124 transmits the operation log information when the focus lens 101 is driven, to the camera control unit 211 via the lens control unit 125. The operation log information will be described later.

Next, in the step S103, the machine learning unit 221 converts the control result into a score in accordance with the NN algorithm using the reward information stored by the reward management unit 223 and the operation log information stored by the operation log holding unit 222. The reward information and scoring of the control result will be described later.

Next, in the step S104, the machine learning unit 221 updates the weight so as to maximize the cumulative score of the control result in accordance with the NN algorithm. This embodiment uses the error backpropagation method for updating the weight, but may use another method. The generated weight is set in the NN data memory 123 in the same procedure as that in the step S101.

Next, in the step S105, the machine learning unit 221 determines whether or not the weight learning is completed. The completion of the learning can be determined by determining whether the number of repetitions of learning (weight updating) has reached a predefined value, or whether a change amount in the cumulative score in the operation log information at the time of update has become smaller than a predefined value. When it is determined that the learning has not yet been completed, the machine learning unit 221 returns to the step S101 to continue the machine learning, and when it is determined that the learning has been completed, the machine learning unit ends the machine learning.

One concrete algorithm for the machine learning is, as shown in this embodiment, deep learning that creates a feature amount and coupling weighting coefficients for learning using NN by itself. The nearest neighbor method, the naive Bayes method, the decision tree, the support vector machine, and the like may also be used, and any available one of these algorithms may be properly selected.

A GPU can generally perform efficient calculations by processing more data in parallel than a CPU. When learning is performed a plurality of times using a machine learning model such as a deep learning model, processing on the GPU is effective. The processing by the machine learning unit 221 may use the GPU in addition to the CPU. More specifically, in executing a learning program including a learning model, the CPU and the GPU cooperatively make calculations for learning. The processing of the machine learning unit 221 may be performed by the CPU or the GPU.

<Operation Log Information>

The operation log information is control result information which is a target to be scored in converting the control result into a score in accordance with the NN algorithm. The operation log management unit 124 collects the input/output information of the NN algorithms illustrated in FIG. 6 which includes X1 to X4 and Y1 for each control cycle in accordance with the NN algorithm, and records it as the operation log information. The operation log management unit 124 also records as the operation log information the power consumption obtained from an unillustrated power detector that measures the power consumption of the focus lens driver 105.

The operation log management unit 124 also records as the operation log information the focus driving command input to the NN control unit 121 and the position information of the focus lens 101 detected by the focus lens detector 106. The operation log management unit 124 determines the position precision E from the target position (focus driving command) and the position information of the focus lens 101, and records them as the operation log information. The operation log management unit 124 calculates the driving speed and driving acceleration of the focus lens 101 from the position information of the focus lens 101, and records them as the operation log information.

The operation log management unit 124 transmits the recorded operation log information to the camera control unit 211 via the lens control unit 125. The camera control unit 211 records the received operation log information in the operation log holding unit 222.

<Reward Information and Scoring of Control Result>

The reward information is information that serves as a reference to a score in converting the control result into scores by the NN algorithm. The reward information includes information on a boundary value of a score and a score assigned to each reward range partitioned by the boundary value for the control result by the NN algorithm.

FIGS. 8A1, 8B1, 8C1, and 8D1 illustrate a relationship between an elapsed time (abscissa axis) and a boundary value (ordinate axis) of a score during learning about the position precision, the driving speed, the driving acceleration, and the power consumption, which are items indicating the control results by the NN algorithm, respectively. FIGS. 8A2, 8B2, 8C2, and 8D2 show data structures of reward information regarding the position precision, the driving speed, the driving acceleration, and the power consumption, respectively. The reward information data includes boundary values of a plurality of reward ranges and scores that can be obtained in the reward range separated by each boundary value. This embodiment shows an example including two boundary values and three scores assigned to the three reward ranges separated by them.

The NN algorithm is learned so that the score obtained as a control result is high. Therefore, it is learned to provide a more precise control when the boundary value is closer to the driving target (target position). For example, it is learned to provide a control so that the position precision is closer to 0 when the boundary value of the position precision is closer to 0. Giving a higher score to one item than other items means that the learning priority of the item is higher than other items. For example, by making the score of the power consumption higher than that of the position precision, learning is made with a control such that the power consumption is prioritized over the position precision.

An ordinate axis of FIG. 8A1 represents a value of a position precision E, which is a difference between the target position and the current position of the focus lens 101. A positive position precision E indicates that the current position is located on the infinity side of the target position, and a negative position precision E indicates that the current position is located on the close side of the target position. The closer the position precision E is to 0, the higher the position precision in the driving control of the focus lens 101 is.

FIG. 8A2 illustrates a data structure of position precision reward information RE, which is the reward information of the position precision E. The position precision reward information RE includes boundary values E1 and E2 in a reward range of position precision E and scores SE1, SE2, and SE3 that can be obtained in each reward range. Assume that AE1 is a reward range of E1×–1 to E1, AE2 is a reward range of E2×–1 to E2 excluding the reward range AE1, and AE3 is a reward range other than the reward ranges AE1 and AE2. When the position precision E falls within the reward ranges AE1, AE2, and AE3, the scores SE1, SE2, and SE3 illustrated in FIG. 8A2 are given as rewards, respectively. The scores SE1, SE2, and SE3 have a relationship of SE1>SE2>SE3, and as the position precision E becomes closer to 0, a higher score is given.

As illustrated in FIG. 8A1, the position precision E at any time Tp1, Tp2, and Tp3 falls within the reward ranges AE2, AE3, and AE1. Therefore, the rewards that can be obtained the times Tp1, Tp2, and Tp3 are the scores SE2, SE3, and SE1.

For example, ±Fδ/2 is set as the boundary value E1 and ±Fδ is set as the boundary value E2. That is, if the current position is controlled within the depth of focus relative to the target position of the focus lens 101, a high score is obtained, and if the current position is out of the depth of focus, a low score is obtained. As the current position of the focus lens 101 is closer to the target position, a higher score is acquired.

An ordinate axis in FIG. 8B1 illustrates a value of a driving speed V of the focus lens 101. A positive driving speed V indicates a driving speed in the infinity direction, and a negative driving speed V indicates a driving speed in the near direction. The closer the driving speed V is to 0, the smaller the driving noise is.

FIG. 8B2 shows a data structure of speed reward information RV, which is the reward information of the driving speed. The speed reward information RV includes boundary values V1 and V2 in the reward range (scores) of the driving speed V and scores SV1, SV2, and SV3 that can be obtained in each reward range.

Assume that AV1 is a reward range of V1×–1 to V1, AV2 is a reward range of V2×–1 to V2 excluding the reward range AV1, and AV3 is a reward range other than the reward ranges AV1 and AV2. When the driving speed V is within the reward ranges AV1, AV2, and AV3, the scores SV1, SV2, and SV3 shown in FIG. 8B2 are given as rewards, respectively. The scores SV1, SV2, and SV3 have a relationship of SV1>SV2>SV3, and the closer the driving speed V is to 0, the higher the score is given.

As illustrated in FIG. 8B1, the driving speeds V at the times Tp1, Tp2, and Tp3 fall within the reward ranges AV2, AV3, and AV1, respectively. The rewards that can be obtained at the time Tp1, Tp2, and Tp3 are the scores SV2, SV3, and SV1, respectively.

For example, V1 and V2 are determined by the relationship between the driving speed V and the driving noise, and as the driving speed V becomes lower, a higher score is obtained. Generally, the lower the driving speed is, the smaller the driving noise is. Therefore, when a higher score is acquired, a quiet driving control is more emphasized.

An ordinate axis in FIG. 8C1 represents a value of a driving acceleration A of the focus lens 101. A positive driving acceleration A indicates a driving acceleration in the infinity direction, and a negative driving acceleration indicates a driving acceleration in the close direction. The closer the driving acceleration A is to 0, the smaller the driving noise is.

FIG. 8C2 shows a data structure of acceleration reward information RA, which is the reward information of the driving acceleration A. The acceleration reward information RA includes boundary values A1 and A2 in a reward range (scores) of the driving acceleration A and scores SA1, SA2, and SA3 that can be obtained in each reward range.

Assume that AA1 is a reward range of A1×−1 to A1, AA2 is a reward range of A2×−1 to A2 excluding the reward range AA1, and AA3 is a reward range other than the reward ranges AA1 and AA2. When the driving acceleration A falls within the reward ranges AA1, AA2, and AA3, the scores SA1, SA2, and SA3 shown in FIG. 8C2 are given as rewards, respectively. The scores SA1, SA2, and SA3 have a relationship of SA1>SA2>SA3, and the closer the driving acceleration A is to 0, the higher the score is given.

As illustrated in FIG. 8C1, the driving acceleration A at the times Tp1, Tp2, and Tp3 fall within the reward ranges AA1, AA3, and AA2, respectively, with respect to the driving noise. Therefore, the rewards that can be obtained in the time Tp1, Tp2, and Tp3 are the scores SA1, SA3, and SA2, respectively.

For example, A1 and A2 are determined by the relationship between the driving acceleration A and the driving noise, and as the driving acceleration A becomes smaller, a higher score is obtained. Generally, the smaller the driving acceleration is, the smaller the driving noise is. Therefore, when a higher score is acquired, a quiet driving control is more emphasized.

An ordinate axis of FIG. 8D1 represents a value of power consumption P as a result of driving of the focus lens 101. As the power consumption P is closer to 0, the power consumption becomes smaller.

FIG. 8D2 shows a data structure of the power consumption reward information RP, which is the reward information of the power consumption P. The power consumption reward information RP includes boundary values P1 and P2 in a reward range (scores) of the power consumption P and scores SP1, SP2, and SP3 that can be obtained in each reward range.

Assume that AP1 is a reward range from 0 to P1, AP2 is a reward range from P1 to P2, and AP3 is a reward range other than the reward ranges AP1 and AP2. When the power consumption P falls within the reward ranges AP1, AP2, and AP3, the scores SP1, SP2, and SP3 illustrated in FIG. 8D2 are given as rewards, respectively. The scores SP1, SP2, and SP3 have a relationship of SP1>SP2>SP3, and as the power consumption P is closer to 0, a higher score is given.

As illustrated in FIG. 8D1, the power consumption P at the times TP1, TP2, and TP3 fall within the reward ranges AP1, AP3, and AP2, respectively. Therefore, the rewards that can be obtained at the times TP1, TP2, and TP3 are the scores SP1, SP3, and SP2, respectively.

For example, P1 and P2 are arbitrarily determined, and as the power consumption P is smaller, a higher score is acquired. Therefore, as a higher score is obtained, a driving control is intended to emphasize a lower power consumption.

The machine learning unit 221 converts the control result into scores in accordance with the NN algorithm for each unit time using the above reward information and the operation log information in driving the focus lens 101 during learning, and accumulates the score for each unit time. Thereby, the cumulative score of the control result by the NN algorithm can be determined. By adding up the scores of the position precision (control error), the driving speed, the driving acceleration, and the power consumption, the total control result by the NN algorithm can be converted into a score.

This embodiment uses an example of using the power consumption as the control result, but may set reward information for the power consumption using the control result of the driving speed and the driving acceleration obtained from the relationship among the driving speed and the driving acceleration and the power consumption. In this embodiment, the number of boundary values is fixed, but may be variable. In this embodiment, the score is determined by the boundary value, but may be determined by using a conversion function that converts the position precision, the driving speed, the driving acceleration, and the power consumption into score. In this case, the conversion function and its coefficients are set as the reward information instead of the boundary value as the reward information.

<Apparatus Constraint Reward Information, User Requirement Reward Information, and User Requirement Reward Conversion Information>

FIG. 9 shows data structures of apparatus constraint reward information and user requirement reward information. The apparatus constraint reward information includes position precision reward information REb, speed reward information RVb, acceleration reward information RAb, and power consumption reward information RPb. The user requirement reward information includes position precision reward information REu, speed reward information RVu, acceleration reward information RAu, and power consumption reward information RPu.

Each of the position precision reward information REb and the position precision reward information REu has the same data structure as that of the position precision reward information RE illustrated in FIG. 8A2. Each of the speed reward information RVb and the speed reward information RVu has the same data structure as that of the speed reward information RV illustrated in FIG. 8B2. Each of the acceleration reward information RAb and the acceleration reward information RAu has the same data structure as that of the acceleration reward information RA illustrated in FIG. 8C2. Each of the power consumption reward information RPb and the power consumption reward information RPu has the same data structure as that of the power consumption reward information RP illustrated in FIG. 8D2.

The apparatus constraint reward information is reward information unique to the lens 100, and is stored in the apparatus constraint reward management unit 224 as reward information that is predetermined according to the lens 100. The user requirement reward information is reward information that is changed according to the user's requirement level for the condition (setting item) relating to the driving of the optical element (that is, the actuator), in other words, the user's requirement level for the driving. This embodiment provides a plurality of setting items, which will be described later, for driving the focus lens 101 in the focus control. The user requirement reward information is determined by the user requirement reward management unit 225 according to the requirement level changed by the user setting and the user requirement reward conversion information.

The reward management unit 223 manages as the reward information a combination of the apparatus constraint reward information and the user requirement reward information.

The apparatus constraint reward information is reward information for defining the minimum control to be observed for the lens 100 (apparatus), and has a reward range determined by the boundary value wider than that of the user requirement reward information. When the control deviates from the expected target, a low score including a negative value is set.

The user requirement reward information can be changed by the user setting via the user requirement input management unit 226, and is determined by the requirement level changed by the user setting and the user requirement reward conversion information. The user requirement input management unit 226 manages (controls) the user requirement input image to be displayed on the display unit 205 so that the user can easily change the requirement level setting. The user requirement input management unit 226 manages the change of the requirement level in response to the input from the operation unit 206 operated by the user. A setting unit includes the operation unit 206, the user requirement input management unit 226, and the display unit 205. The user requirement input image displayed on the display unit 205 by the user requirement input management unit 226 will be described later.

In learning the NN algorithm, as illustrated in FIGS. 8A1 to 8D2, the scores of the control result are determined using each of the apparatus constraint reward information and the user requirement reward information, and the score of the final control result is determined as a sum of these scores.

A description will now be given of a method of determining the user requirement reward information according to the requirement level set by the user. FIGS. 10A to 10D show a data structure of the user requirement reward conversion information. The user requirement reward conversion information corresponds to information indicating a relationship between the requirement level set by the user and the driving target in each setting item.

FIG. 10A shows a data structure of the position precision user requirement reward conversion information UREu. The position precision user requirement reward conversion information UREu includes a plurality of pieces of position precision reward information REu having different boundary values and scores for respective levels.

FIG. 10B shows a data structure of the quietness user requirement reward conversion information URSu. The quietness user requirement reward conversion information URSu includes the speed user requirement reward conversion information URVu and the acceleration user requirement reward conversion information URAu. Each of the speed user requirement reward conversion information URVu and the acceleration user requirement reward conversion information URAu includes a plurality of pieces of speed reward information RVu and a plurality of pieces of acceleration reward information RAu having different boundary values and scores for respective levels.

FIG. 10C illustrates a data structure of the power consumption user requirement reward conversion information UR Pu. The power consumption user requirement reward conversion information URPu includes a plurality of power consumption reward information RPu having different boundary values and scores for respective levels.

FIG. 10D illustrates a data structure of the responsiveness user requirement reward conversion information URRu. The responsiveness user requirement reward conversion information URRu includes a plurality of pieces of speed reward information RVu and a plurality of pieces of acceleration reward information RAu, each of which has different boundary values and scores for respective levels.

Position precision user requirement reward conversion information UREu, quietness user requirement reward conversion information URSu, power consumption user requirement reward conversion information URPu, and responsiveness user requirement reward conversion information URRu have levels 1, 2, 3, 4, and 5 in descending order of the user requirement level. The boundary values and the scores are determined so that the requirement level is lowered in this order from the highest. More specifically, the boundary value at the level 1 is closer to the driving target in the setting item than that at another level, and a high score is given.

In the responsive user requirement reward conversion information URRu, the user's requirement level is higher when the responsiveness of the focus lens 101 is better, that is, the driving speed and the driving acceleration are higher, and thus the scoring order is reversed in comparison with the quietness user requirement reward conversion information URSu. More specifically, the scores satisfy a relationship of $SVu1<SVu2<SVu3$, and a higher score is obtained when the driving speed V is higher. The scores satisfy a relationship of $SAu1<SAu2<SAu3$, and a higher score is obtained when the driving acceleration A is higher.

The level information of each of the position precision, the quietness, and the power consumption set by the user through the operation unit 206 illustrated in FIG. 1 is transmitted to the user requirement reward management unit 225 via the camera control unit 211 and the user requirement input management unit 226. The user requirement reward management unit 225 determines the user requirement reward information based on the level information of each of the position precision, the quietness, the power consumption, and the responsiveness set by the user from the user requirement reward conversion information illustrated in FIGS. 10A to 10D stored by the user.

Thus, the NN algorithm is learned based on the requirement level changed by the user setting and the user requirement reward information, and the NN algorithm (machine learning model) configured to perform an optimum control according to the set requirement level is created. The generated NN algorithm is sent from the camera control unit 211 to the lens control unit 125, stored in the NN data memory 123, and used for the focus control.

<User Requirement Input Image>

FIG. 11A1 illustrates an example of the user requirement input image displayed on the display unit 205 when the user is caused to directly set (input) the user requirement level of each of the position precision, the quietness, the power consumption, and the responsiveness as a plurality of setting items. In this image example, the display indicates that the user can arbitrarily set the requirement level of each of the position precision, the quietness, the power consumption, and the responsiveness among the levels 1 to 5. The user operates the operation unit 206 to move the setting index (black dot) to the requirement level.

FIG. 11A2 shows the requirement level set in FIG. 11A1. The position precision user requirement reward conversion information UREu (referred to as a position precision level hereinafter) is set to a level 4, and the quietness user requirement reward conversion information URSu (referred to as quietness level hereinafter) is set to a level 1. The power consumption user requirement reward conversion information URPu (referred to as power consumption level hereinafter) is set to a level 3, and the responsive user requirement reward conversion information URRu (referred to as responsiveness level hereinafter) is set to a level 1. This example sets the quietness level to 1 in response to the user's requirement to give the highest priority to the quietness, and gives the priority to the responsiveness lower than the quietness but sets the responsiveness level as high as possible.

Since the user cannot quantitatively recognize each level in the responsiveness level, it is difficult for the user to determine which level the responsiveness level should be set to. If the responsiveness level is also set to 1 on the assumption that higher responsiveness is better, as illustrated in FIG. 11A1, the user requirement level may not be satisfied because the driving noise is minimized at the quietness level with the highest priority due to an actual dependency between the quietness and the responsiveness. Therefore, in order for the user to properly set the requirement level, it is necessary but very difficult to determine the setting while recognizing the dependency among the setting items.

In order to solve such a problem, this embodiment provides such a user interface that the requirement level can be easily set (changed) without making the user aware of the current requirement level. FIGS. 12A1 to 12C2 show a relationship between the example of the user requirement input image on the display unit 205 and the internally set requirement level according to this embodiment.

FIG. 12A1 illustrates an initial display example when the user is asked to input the setting. FIG. 12A2 illustrates the requirement level as internal data set for each setting item in the user requirement input management unit 226 in the initial display state of FIG. 12A1. In this example, the position precision level is 4, the quietness level is 2, the power consumption level is 3, and the responsiveness level is 5. In FIG. 12A1, a setting index (black dot) is displayed at the center position as the reference position regardless of the current requirement level set by the user requirement input management unit 226. Then, a display indicates that the user needs to select whether to raise (UP) or lower (DOWN) the requirement level of the performance corresponding to each setting item in the operation unit 206. In other words, the user is made to select (that is, change the requirement level) to raise or lower the requirement level without displaying the currently set requirement level to the user. Then, the user requirement input image that guides the operation is displayed on the display unit 205. By making such a display, the user needs to select whether to raise or lower the performance corresponding to each setting item, and can easily set the requirement level.

FIG. 12B1 illustrates a display example when a user operation raises the requirement level of each of the position precision and the quietness from the initial display state of FIG. 12A1. FIG. 12B2 illustrates the internal data of the user's requirement level in the state of FIG. 12B1, the position precision level is changed from level 4 to level 3, and the quietness level is changed from level 2 to level 1. According to the change of each requirement level, the user requirement reward management unit 225 determines the user requirement reward information from the user requirement reward conversion information as described above, and the NN algorithm learns. When the requirement level for the quietness is raised, the responsiveness that depends on the quietness is grayed out as illustrated in FIG. 12B1 to display that the requirement level cannot be changed. This configuration can raise the requirement levels for both the quietness and the responsiveness that depend on each other, consequently prevent the their performance deteriorations, and more accurately reflect the user requirement levels.

FIG. 12C1 illustrates a display example when accepting a change in the requirement level again after learning is completed with the settings in FIGS. 12B1 and 12B2. FIG. 12C2 illustrates the internal data of the requirement level in the state in FIG. 12C1, and is not changed from the internal data of the requirement level in FIG. 12B2. However, the display state in FIG. 12C1 is changed from the display state of FIG. 12B1.

Since the display for causing the user to set the requirement level is a display for causing him to input whether to raise or lower the performance based on the current performance at which learning is completed, the setting index is displayed again at the reference position (center position) in the position precision in which the requirement level is raised in FIG. 12B1. In the case of the quietness, the current quietness level is the maximum level of 1, and the level of the responsiveness that depends on the quietness is the lowest level of 5. Since it is impossible to improve the quietness performance any longer, a side used to raise the setting is displayed so that the requirement level for the quietness cannot be raised any longer.

As described above, in this embodiment, the user simply selects and specifies whether to raise or lower the performance corresponding to each setting item from the current performance, thereby simultaneously raising a plurality of performances that depend on one another. This embodiment can prevent a user's erroneous operation that attempts to improve the performance that cannot be further improved. That is, the user can easily set the plurality of performance levels.

Figure 16:
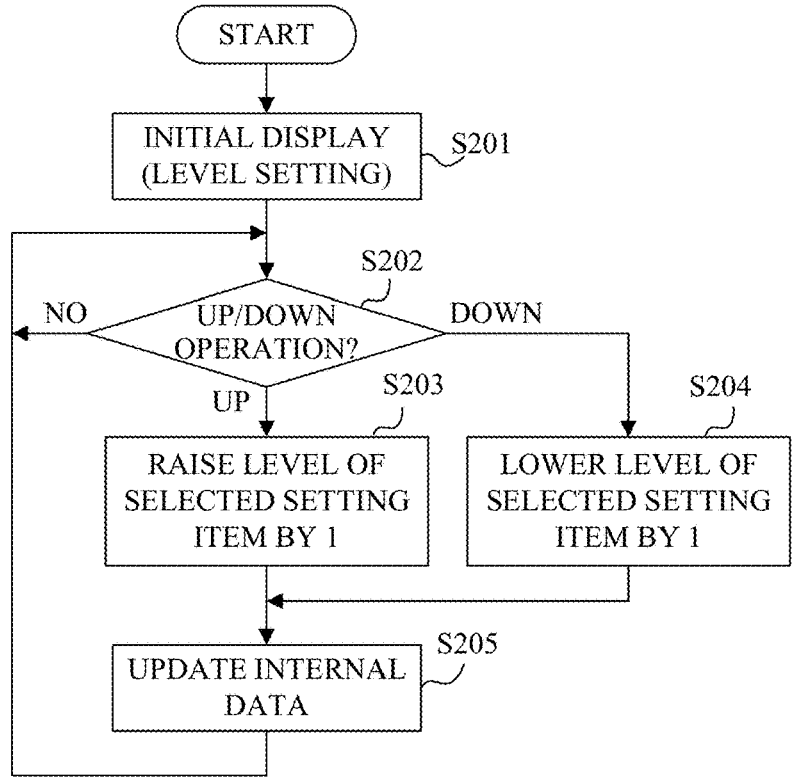
FIG. 16 is a flowchart showing display processing of the user requirement input image according to the first embodiment.

FIG. 16 illustrates processing (generating method) by which the user requirement input management unit 226 displays the user requirement input image on the display unit 205 according to this embodiment. The user requirement input management unit 226 executes this processing according to a computer program.

In the step S201, the user requirement input management unit 226 performs the initial display illustrated in FIG. 12A1 on the display unit 205. At this time, for each setting item, a requirement level corresponding to the internal data illustrated in FIG. 12A2 is set.

Next, in the step S202, the user requirement input management unit 226 determines whether there is an operation of raising (UP) or lowering (DOWN) the performance of the setting item selected by the user through the operation unit 206. The user requirement input management unit 226 repeats this step if there is no operation. In response to the UP operation, the flow proceeds to the step S203 to raise the requirement level of the selected setting item by one step, and the flow proceeds to the step S205. On the other hand, in response to the DOWN operation, the flow proceeds to the step S204 to lower the requirement level of the selected setting item by one step, and the flow proceeds to the step S205.

In the step S205, the user requirement input management unit 226 updates the internal data at the requirement level after the change in the step S203 or S204. Then, the flow returns to the step S202.

<Another User Requirement Input Image>

This embodiment has discussed a display example in which the user can set whether to raise or lower the requirement level of each performance by one step, but may set whether to raise or lower it by multiple steps. This embodiment may set whether or not to raise the requirement level of the performance.

This embodiment has discussed an example that prohibits the requirement levels of the quietness and the responsiveness that have a direct interdependency from being simultaneously raised, but there are not a few interdependencies among the other performances. For example, in general, when the responsiveness is high, the power consumption tends to increase and the position precision also tends to lower. Therefore, the setting item that can change the requirement level may be limited to one.

This embodiment has discussed an example of displaying that the requirement level cannot be raised any longer when the requirement level of a specific performance reaches the maximum level of 1. Alternatively, a display can be made by lowering another performance level that has an interdependency with the specific performance so as to enable the requirement level of the specific performance to be raised. For example, even if the quietness level is a level 1, if the responsiveness level is a level 4, a raise in the quietness requirement level may be made acceptable, and if the quietness requirement level is raised, the responsiveness level may be lowered to a level 5. In such a case, among the setting items that can lower the performance level, one that has a larger dependency relationship with the setting item that raise the requirement level may be selected as priority.

This embodiment has discussed an example of changing the performance level based on the user setting of the performance requirement level, but the performance level may be changed by changing the boundary value and the score of the user requirement reward conversion information to change the reward information.

<Examples Other than Focus Control>

This embodiment has discussed the user requirement input image for the focus (AF) control that drives the focus lens 101, but may display the same user requirement input image in another control such as a zoom control, a diaphragm control, and an image stabilization control.

The quietness and the power consumption have common problems when not only the focus lens 101 but also another optical element such as the zoom lens 102, the diaphragm unit 103, and the correction lens 104 are driven by an actuator. For the zoom lens 102, the required position precision is determined from a relationship between an enlargement changing amount of the object and a change in an angle of view during the zooming. The position precision of the zoom lens 102 is also determined from a relationship between a driving amount of the zoom lens 102 and an angle-of-view changing amount. For the diaphragm unit 103, the position precision is determined from a relationship between a diaphragm driving amount and a luminance changing amount in an image. For the correction lens 104, the position precision is determined from a relationship between a focal length of the imaging optical system and a shift amount of an image.

<Other Lens Information>

This embodiment has discussed the depth of focus and the focus sensitivity as examples of the lens information, but may include the orientation, the temperature, and the ambient sound volume of the lens 100 in the lens information. Since the gravity affects driving of the optical element, a driving force (or torque) required for the actuator may be changed according to the orientation of the lens 100. Since the characteristic of the lubricating oil used for the driving mechanism of the optical element changes depending on the temperature, the driving force of the actuator may be changed according to the temperature of the lens 100. If the driving noise of the actuator is smaller than the ambient sound volume, even if the limit of the driving speed of the optical element is removed, the image acquired from the imaging is not affected. Therefore, the upper limit of the driving speed may be changed according to the ambient sound volume.

Second Embodiment

<Maintaining of Requirement Level According to Imaging Mode>

A camera system according to a second embodiment of the present invention has the same configuration as that of the camera system according to the first embodiment illustrated in FIG. 1. The first embodiment has discussed the example of the user requirement input image that enables the user to easily set the requirement level, but the user requirement level may significantly differ depending on the imaging condition. For example, still image capturing is highly demanded for the in-focus precision because it is demanded to focus on an object with high accuracy, and motion image capturing is highly demanded for the quietness so as to prevent the driving noise of the actuator from being recorded. Therefore, if the user sets the requirement level based on the currently set performance regardless of the imaging condition, the user must arduously reset the requirement level for each setting item whenever the imaging condition is switched between the still image capturing and motion image capturing. Accordingly, the second embodiment stores the set value of the requirement level for each imaging mode as the imaging condition, and changes the requirement level from the set value corresponding to the selected imaging mode.

<User Requirement Input Image>

FIGS. 13A1 to 13C2 illustrate a relationship between the example of the user requirement input image displayed on the display unit 205 and the internally set requirement level according to this embodiment. FIG. 13A1 illustrates an initial display example in causing the user to input the setting. The user can switch the imaging mode between a still image mode for capturing a still image and a motion image mode for capturing a motion image through the operation unit 206, and FIG. 13A1 illustrates a case where the current imaging mode is the still image mode. The setting items include the position precision, the quietness, the power consumption and the responsiveness similar to the first embodiment.

FIG. 13A2 illustrates a requirement level (set value) as internal data set for each setting item in the user requirement input management unit 226 in the initial display state in FIG. 13A1. This requirement level is stored for each imaging mode. In this illustration, as the requirement level in the still image mode, the position precision level is $_1$, the quietness level is 5, the power consumption level is 4, and the responsiveness level is 2. As the requirement level in the motion image mode, the position precision level is 3, the quietness level is 1, the power consumption level is 2, and the responsiveness level is 4.

FIG. 13A1 illustrates a setting index (black dot) at the center position as a reference position regardless of what level the current requirement level is in the still image mode set by the user requirement input management unit 226. Then, similar to the first embodiment, a display indicates that the user needs to specify (select) whether to raise (UP) or lower (DOWN) the requirement level of the performance corresponding to each setting item.

FIG. 13B1 illustrates a display example when the user setting is made to raise the requirement level of the power consumption from the initial display state in FIG. 13A1. FIG. 13B2 illustrates the user's requirement level when operated in this state, and the power consumption level in the still image mode is changed from the level 4 to the level 3.

FIG. 13C1 illustrates a display example when the imaging mode is changed from the initial display state of FIG. 13A1 to the motion image mode by the user and the requirement level of the position precision is raised. FIG. 13C2 illustrates the internal data of the user's requirement level in the state of FIG. 13B1, and the position precision level in the motion image mode is changed from the level 3 to the level 2.

In accordance with each requirement level changed in FIGS. 13B2 and 13C2, the user requirement reward management unit 225 determines the user requirement reward information from the user requirement reward conversion information as described in the first embodiment, and the NN algorithm learns.

Thus, the requirement level managed by the user requirement input management unit 226 is stored for each imaging mode, and when the requirement level corresponding to the currently set imaging mode is changed, learning is executed accordingly. Therefore, the user can change the requirement level based on the requirement level set for each imaging mode in which the requirement level for each setting item is significantly different, and does not have to change the requirement levels for all the setting items whenever the imaging mode is changed.

<Other Imaging Conditions>

This embodiment has discussed the imaging mode as the imaging condition, but the imaging condition can include anything that may change the user's requirement level such as the orientation, the temperature, and the ambient sound volume of the lens 100, and the type of the object.

Third Embodiment

<Weighting of Requirement Level Change According to User Priority>

A camera system according to a third embodiment of the present invention has the same configuration as that of the camera system according to the first embodiment illustrated in FIG. 1. The first embodiment has discussed the example of the user requirement input image that causes the user to easily set the requirement level, but the user does not quantitatively recognize how much level the performance of the setting item changes by changing the requirement level for each setting item. Therefore, even when the requirement level is changed, the performance required by the user may not be reached. Accordingly, the third embodiment acquires the user priority (referred to as a user priority hereinafter) for each setting item from the imaging information, and makes different a change amount of the requirement level (priority weight value) for single requirement level raising (UP) operation according to the user priority.

<Imaging Information>

The imaging information is information indicating the influence on the captured image in the focus control, and is information obtained from the captured image generated by imaging of the camera body 200. This embodiment more properly realizes the performance required by the user by changing the requirement level in consideration of the influence of the focus control on the captured image by using the imaging information.

The imaging information is obtained when the camera control unit 211 analyzes a captured image acquired by the signal processing circuit 203, and is sent from the camera control unit 211 to the user requirement input management unit 226. More specifically, the imaging information includes a depth of focus, a moving speed of a moving object, an ambient sound volume detected by an unillustrated microphone, a power source residual amount of an unillustrated battery, and the like.

<Priority Weight>

FIGS. 14A1 to 14B2 illustrate a relationship among an example of the user requirement input image displayed on the display unit 205 and the internally set requirement level and priority weight according to this embodiment. FIG. 14A1 illustrates an initial display example in causing the user to input the setting. FIG. 14A2 illustrates the requirement level as internal data set for each setting item in the user requirement input management unit 226 in the initial display state in FIG. 14A1. It also illustrates the priority weight determined from the imaging information for each setting item. The current requirement levels are a position precision level of 1, a quietness level of 5, a power consumption level of 4, and a responsiveness level of 2.

Regarding the priority weight, an example where the power supply residual amount is low will be described. It is determined that the user priority of the power consumption is high on the assumption that the user's requirement for a low power consumption is likely to increase when the power supply residual amount becomes below a predetermined value, and the priority weight to the power consumption is set higher than other setting items. In FIG. 14A2, the priority weight to the power consumption is 2, and the priority weight to the other setting items is 1.

In FIG. 14A1, a setting index (black dot) is displayed at the center position as a reference position regardless of what level the current requirement level is set by the user requirement input management unit 226. Similar to the first embodiment, the display indicates that the user needs to specify (select) whether to raise (UP) or lower (DOWN) the requirement level of the performance corresponding to each setting item.

FIG. 14B1 illustrates a display example when the user setting is made to raise the requirement level of the power consumption from the initial display state in FIG. 14A1. FIG. 14B2 illustrates the user's requirement level in the state in FIG. 14B1, and the power consumption level is raised by the priority weight value (2), that is, from the level 4 to the level 2.

In accordance with each requirement level changed in FIG. 14B2, the user requirement reward management unit 225 determines the user requirement reward information from the user requirement reward conversion information as described in the first embodiment, and the NN algorithm learns.

Thus, by increasing the priority weight of the setting item that is presumed to have high user priority obtained from the imaging information and by enhancing a performance improvement effect of the setting item, the user's requirement is highly likely to be satisfied.

Figure 17:
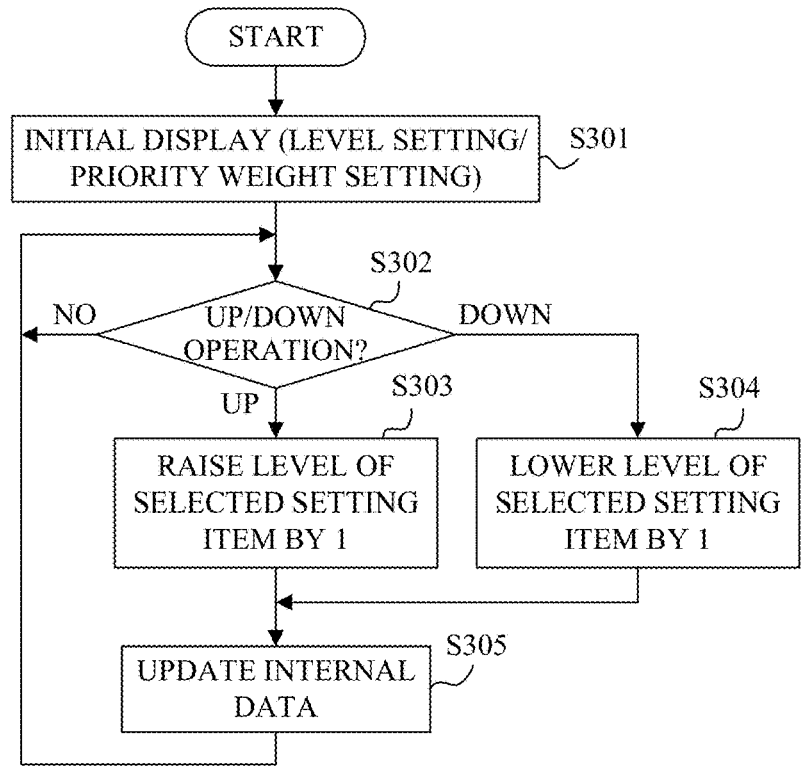
FIG. 17 is a flowchart showing display processing of the user requirement input image according to the third embodiment.

FIG. 17 illustrates processing by which the user requirement input management unit 226 displays the user requirement input image on the display unit 205 according to this embodiment.

In the step S301, the user requirement input management unit 226 performs the initial display illustrated in FIG. 14A1 on the display unit 205. At this time, it sets a requirement level and a priority weight for each setting item according to the internal data illustrated in FIG. 14A2.

Next, in the step S302, the user requirement input management unit 226 determines whether there is an operation of raising (UP) or lowering (DOWN) the performance of the setting item selected by the user through the operation unit 206. The user requirement input management unit 226 repeats this step if there is no operation. In response to the UP operation, the flow proceeds to the step S303, to raise the requirement level of the selected setting item by the priority weight value, and the flow proceeds to the step S305. On the other hand, in response to the DOWN operation, the flow proceeds to the step S304 to lower the requirement level of the selected setting item by one step, and the flow proceeds to the step S305.

In the step S305, the user requirement input management unit 226 updates the internal data at the requirement level after the change in the step S303 or S304. Then, the flow returns to the step S302.

A description will now be given of a method of selecting the setting item that lowers the requirement level. FIG. 15 illustrates a relationship among a display example, and the internally set requirement level and priority weight according to this embodiment.

FIGS. 15A1 to 15B2 illustrate a relationship among an example of the user requirement input image displayed on the display unit 205, and the internally set requirement level and priority weight according to this embodiment. FIG. 15A1 illustrates an initial display example in causing the user to input the setting. FIG. 15A2 illustrates a requirement level as internal data set for each setting item in the user requirement input management unit 226 in the initial display state in FIG. 15A1. It also illustrates a priority weight determined from the imaging information for each setting item.

The current requirement levels include a position precision level of 1, a quietness level of 2, a power consumption level of 4, and a responsiveness level of 2. Regarding the priority weight, an example will be described where the ambient sound volume is low and a moving speed of an object is high. When the ambient sound volume is lower than a predetermined value, it is determined that the user priority to the quietness is high on the assumption that the user's requirement for the quietness is likely to increase, and the priority weight to the quietness is set high. When the moving speed of the object is higher than a predetermined value, it is determined that the user priority to the responsiveness is high on the assumption that the user's requirement for the responsiveness is likely to increase, and the priority weight to the responsiveness is set high. At this time, the higher the moving speed of the object is, the higher the priority weight to the responsiveness is set. In FIG. 15A2, the priority weight to the quietness is set to 2, the priority weight to the responsiveness is set to 3, and the priority weight to other setting items is set to 1.

In FIG. 15A1, the setting index (black dot) is displayed at the center position as a reference position regardless of the current requirement level set by the user requirement input management unit 226. Similar to the first embodiment, a display indicates that the user needs to specify (select) whether to raise (UP) or lower (DOWN) the requirement level of the performance corresponding to each setting item.

FIG. 15B1 illustrates a display example when the user setting is made to raise the requirement level of the responsiveness from the initial display state in FIG. 15A1. FIG. 15B2 illustrates the user's requirement level in the state of FIG. 15B1. Regarding the responsiveness for which the requirement level has been raised, the responsiveness level is raised by the priority weight value (3). When the responsiveness level reaches the upper limit of the level 1, a responsiveness performance improving effect is enhanced by lowering the requirement level of another setting item. At this time, the requirement level is lowered in order from a setting item having the lowest priority weight, that is, a setting item having the lowest user priority. Therefore, when the responsiveness level is changed from the level 2 to the level 1, two remaining levels are lowered from the setting item having the lowest priority weight. More specifically, the position precision level is changed from the level 1 to the level 2, and the power consumption level is changed from the level 4 to the level 5.

In accordance with each requirement level changed in FIG. 15B2, the user requirement reward management unit 225 determines the user requirement reward information from the user requirement reward conversion information as described in the first embodiment, and the NN algorithm learns.

Thus, by setting the priority weight based on the imaging information and lowering a requirement level of the setting item having a low priority weight when a requirement level of a setting item presumed to have a high user priority is raised, a performance improvement effect of the setting item having the high user priority can be enhanced. Thereby, the user's requirement can be reflected.

<Other Setting Methods of Priority Weight>

This embodiment has described setting the priority weight (priority) based on the imaging information, but may set the priority weight using another method. For example, the priority weight may be set according to the frequency at which the user changes the requirement level. That is, the higher the changing frequency is, the higher the priority weight is set, so that a performance improvement effect of a setting item in which the user frequently changes the requirement level can be enhanced. In addition, the priority weight may be set according to the changing history of the requirement level by the user. That is, when the requirement level of the setting item corresponding to the user operation has reached the upper limit and a requirement level of another setting item is to be lowered, the priority weight of the recently changed setting item is raised so as to prevent the priority weight of that setting item from being lowered. Even if the priority weight is set by these setting methods, the performance required by the user can be more properly realized.

This embodiment has discussed a case where the performance is changed by changing the requirement level of each performance based on the requirement level setting and the priority weight, but may change the performance by changing the boundary value and the score of the user requirement reward conversion information according to the priority weight.

The accessory is not limited to the lens, but may be anything attachable to and detachable from the camera body and configured to control driving of the optical element.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each of the above embodiments can provide, for example, an optical apparatus advantageous to generate reward information for generating a machine learning model.

This application claims the benefit of Japanese Patent Application No. 2020-208760, filed on Dec. 16, 2020, which is hereby incorporated by reference herein in its entirety.

What is claimed is:

1. An optical apparatus comprising:
   a setting unit configured to set a requirement relating to driving of an optical element by an actuator; and
   a processor configured to generate reward information for generating a machine learning model for controlling the driving,
   wherein the setting unit is configured to receive an input on a change of a level of the requirement, and
   wherein the processor generates the reward information such that an influence of the reward information on a reward for the requirement increases as the level of the requirement is higher.

2. The optical apparatus according to claim 1, wherein the setting unit is configured for the user to input a raise of the level.

3. The optical apparatus according to claim 1, wherein the setting unit is configured for the user to set a plurality of requirements relating to the driving.

4. The optical apparatus according to claim 3, wherein the setting unit is configured for the user to set one of two requirements depending on each other among the plurality of requirement.

5. The optical apparatus according to claim 1, wherein the requirement relates to at least one of a precision, a sound, a power consumption, or a response characteristic of the driving.

6. The optical apparatus according to claim 1, wherein the setting unit is configured to update, based on the level of the requirement and an input of the change, the level of the requirement.

7. The optical apparatus according to claim 1, wherein the setting unit is configured for the user to set the requirement with respect to each image pickup condition.

8. The optical apparatus according to claim 7, wherein the image pickup condition relates to at least one of an image pickup mode, an orientation, a temperature, and an ambient sound volume, or an object of the optical apparatus.

9. An optical apparatus comprising:
   a setting unit configured to set a requirement relating to driving of an optical element by an actuator; and
   a processor configured to generate reward information for generating a machine learning model for controlling the driving, based on a level of the requirement,
   wherein the setting unit is configured to receive an input on a change of the level of the requirement and is configured to cause, with respect to a plurality of requirements relating to the driving, change amounts of the level for an input of the change to be different from each other based on priorities of the plurality of requirements.

10. The optical apparatus according to claim 9, wherein the setting unit is configured to obtain the priorities based on at least one of an image obtained by an image pickup, a depth of focus, an ambient sound volume, a power source residual amount, a moving speed of an image plane, or a setting history by the setting unit.

11. An optical apparatus comprising:
    a setting unit configured to set a requirement relating to driving of an optical element by an actuator; and
    a processor configured to generate reward information for generating a machine learning model for controlling the driving, based on a level of the requirement,
    wherein the setting unit is configured to receive an input on a change of the level of the requirement and is configured not to raise a level of one of a plurality of requirements relating to the driving, which is to be raised in an input of the change, but to lower a level of another of the plurality of requirements.

12. The optical apparatus according to claim 11, wherein the setting unit is configured to lower the level of the other of the plurality of requirements based on priorities of the plurality of requirements.

13. The optical instruments according to claim 1, further comprising a generating unit configured to generate the machine learning model.

14. A generating method of generating reward information for generating a machine learning model for controlling driving of an optical element by an actuator, the generating method comprising:
    setting a requirement relating to the driving;
    receiving an input on a change of a level of the requirement; and
    generating the reward information,
    wherein the reward information is generated such that an influence of the reward information on a reward for the requirement increases as the level of the requirement is higher.

15. A storage medium storing a program that causes a computer to execute a generating method of generating reward information for generating a machine learning model for controlling driving of an optical element by an actuator, the generating method comprising:
    set setting a requirement relating to the driving;
    receiving an input on a change of a level of the requirement; and
    generating the reward information, wherein the reward information is generated such that an influence of the reward information on a reward for the requirement increases as the level of the requirement is higher.

* * * * *